(12) United States Patent
Bartel et al.

(10) Patent No.: US 12,268,274 B2
(45) Date of Patent: *Apr. 8, 2025

(54) ARTICLES INCLUDING COATED FIBERS AND METHODS OF MAKING COATED FIBERS AND ARTICLES

(71) Applicant: NIKE, Inc., Beaverton, OR (US)

(72) Inventors: Aaron Bartel, Beaverton, OR (US); Charles R. Edwards, Portland, OR (US); Stefan E. Guest, Portland, OR (US); Christian Alexander Steinbeck, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,008

(22) Filed: May 16, 2023

(65) Prior Publication Data
US 2023/0276898 A1 Sep. 7, 2023

Related U.S. Application Data

(63) Continuation of application No. 17/886,399, filed on Aug. 11, 2022, now Pat. No. 11,723,429, which is a
(Continued)

(51) Int. Cl.
*A43B 13/02* (2022.01)
*A43B 1/00* (2006.01)
(Continued)

(52) U.S. Cl.
CPC .......... *A43B 13/026* (2013.01); *A43B 1/0027* (2013.01); *A43B 5/185* (2013.01);
(Continued)

(58) Field of Classification Search
CPC ... A43B 13/026; A43B 13/023; A43B 13/185; A43B 13/189; A43B 13/04; A43B 1/007;
(Continued)

(56) References Cited

U.S. PATENT DOCUMENTS

| 4,002,792 A | 1/1977 | Petersen et al. |
| 4,427,802 A | 1/1984 | Moulton et al. |

(Continued)

FOREIGN PATENT DOCUMENTS

| CN | 1197093 A | 10/1998 |
| CN | 1398311 A | 2/2003 |

(Continued)

OTHER PUBLICATIONS

International Preliminary Report on Patentability for PCT/US2019/019714 mailed Dec. 1, 2020.
(Continued)

*Primary Examiner* — Camie S Thompson
(74) *Attorney, Agent, or Firm* — SHOOK, HARDY & BACON L.L.P.

(57) ABSTRACT

The present disclosure is directed to articles that include one or more coated fiber(s) (i.e., fiber(s) with a cured coating disposed thereon), where the coating includes a matrix of crosslinked polymers and optionally a colorant (e.g., pigment particles or dye or both). The cured coating is a product of crosslinking a coating composition including uncrosslinked polymers (e.g., a dispersion of uncrosslinked polymers in a carrier, wherein the uncrosslinked polymers are crosslinked to form the matrix of crosslinked polymers). The present disclosure is also directed to articles including the coated fibers, methods of forming the coated fibers and articles, and methods of making articles including the coated fibers.

20 Claims, 3 Drawing Sheets

Related U.S. Application Data continuation of application No. 17/065,419, filed on Oct. 7, 2020, now Pat. No. 11,464,281, which is a continuation of application No. 16/171,610, filed on Oct. 26, 2018, now Pat. No. 10,980,310.

(60) Provisional application No. 62/724,260, filed on Aug. 29, 2018, provisional application No. 62/712,683, filed on Jul. 31, 2018, provisional application No. 62/617,665, filed on Jan. 16, 2018, provisional application No. 62/577,904, filed on Oct. 27, 2017.

(51) Int. Cl.
| | |
|---|---|
| *A43B 5/18* | (2006.01) |
| *A43B 13/04* | (2006.01) |
| *A43B 13/18* | (2006.01) |
| *A63B 71/12* | (2006.01) |
| *C08J 3/24* | (2006.01) |
| *C08J 9/36* | (2006.01) |
| *C09D 7/20* | (2018.01) |
| *C09D 7/41* | (2018.01) |
| *C09D 175/06* | (2006.01) |
| *D06M 15/572* | (2006.01) |
| *D06M 15/705* | (2006.01) |
| *E21B 47/007* | (2012.01) |
| *E21B 47/06* | (2012.01) |
| *E21B 47/113* | (2012.01) |
| *E21B 49/00* | (2006.01) |

(52) U.S. Cl.
CPC ............ *A43B 13/023* (2013.01); *A43B 13/04* (2013.01); *A43B 13/187* (2013.01); *A43B 13/189* (2013.01); *A63B 71/1225* (2013.01); *C08J 3/24* (2013.01); *C08J 9/365* (2013.01); *C09D 7/20* (2018.01); *C09D 7/41* (2018.01); *C09D 175/06* (2013.01); *D06M 15/572* (2013.01); *D06M 15/705* (2013.01); *E21B 47/007* (2020.05); *E21B 47/06* (2013.01); *E21B 49/008* (2013.01); *A63B 2071/1258* (2013.01); *C08J 2300/22* (2013.01); *C08J 2300/24* (2013.01); *C08J 2300/26* (2013.01); *C08J 2325/06* (2013.01); *C08J 2331/04* (2013.01); *C08J 2333/10* (2013.01); *C08J 2375/06* (2013.01); *E21B 47/114* (2020.05)

(58) Field of Classification Search
CPC . A43B 5/185; C09D 7/20; C09D 7/41; C09D 175/06; C08J 3/24; C08J 9/365; C08J 2300/22; C08J 2300/24; C08J 2300/26; C08J 2325/06; C08J 2331/04; C08J 2333/10; C08J 2375/06; D06M 15/572; D06M 15/705
See application file for complete search history.

(56) References Cited

U.S. PATENT DOCUMENTS

| | | |
|---|---|---|
| 4,523,005 A | 6/1985 | Szycher |
| 4,599,413 A | 7/1986 | Moulton et al. |
| 5,244,739 A | 9/1993 | Carlson et al. |
| 5,334,690 A | 8/1994 | Schafheutle et al. |
| 5,713,141 A | 2/1998 | Mitchell et al. |
| 5,952,065 A | 9/1999 | Mitchell et al. |
| 5,952,250 A | 9/1999 | Kim et al. |
| 5,969,076 A | 10/1999 | Lai et al. |
| 6,001,469 A | 12/1999 | Verardi et al. |
| 6,013,340 A | 1/2000 | Bonk et al. |
| 6,082,025 A | 7/2000 | Bonk et al. |
| 6,127,026 A | 10/2000 | Bonk et al. |
| 6,203,868 B1 | 3/2001 | Bonk et al. |
| 6,321,465 B1 | 11/2001 | Bonk et al. |
| 6,897,281 B2 | 5/2005 | Lubnin et al. |
| 7,008,555 B2 | 3/2006 | Hayes et al. |
| 7,476,705 B2 | 1/2009 | Pajerski |
| 7,611,547 B2 | 11/2009 | Bracken et al. |
| 7,842,391 B2 | 11/2010 | Watkins et al. |
| 10,980,311 B2 | 4/2021 | Edwards |
| 11,464,281 B2 | 10/2022 | Bartel et al. |
| 11,647,809 B2 | 5/2023 | Edwards |
| 11,723,429 B2 * | 8/2023 | Bartel ............... A63B 71/1225 166/250.01 |
| 2001/0005660 A1 | 6/2001 | Li et al. |
| 2003/0060608 A1 | 3/2003 | Hasemann et al. |
| 2003/0131756 A1 | 7/2003 | Smith et al. |
| 2003/0154871 A1 | 8/2003 | Laksin et al. |
| 2007/0020463 A1 | 1/2007 | Trainham |
| 2008/0003399 A1 | 1/2008 | Abrams |
| 2008/0176061 A1 | 7/2008 | Ambrose et al. |
| 2009/0069122 A1 | 3/2009 | Laliberty |
| 2009/0071036 A1 | 3/2009 | Hooper et al. |
| 2010/0113687 A1 | 5/2010 | Schaefer et al. |
| 2010/0159772 A1 | 6/2010 | Ashida et al. |
| 2013/0176369 A1 | 7/2013 | Gotou et al. |
| 2014/0250720 A1 | 9/2014 | Miner et al. |
| 2015/0128452 A1 | 5/2015 | Hull et al. |
| 2015/0210034 A1 | 7/2015 | Tarrier et al. |
| 2016/0075113 A1 | 3/2016 | Chang et al. |
| 2016/0295963 A1 | 10/2016 | Chang et al. |
| 2016/0304734 A1 | 10/2016 | Feng et al. |
| 2017/0088735 A1 | 3/2017 | Jakubek et al. |
| 2018/0229426 A1 | 8/2018 | Douroumis et al. |
| 2019/0125028 A1 | 5/2019 | Bartel et al. |
| 2019/0125029 A1 | 5/2019 | Edwards |
| 2020/0299513 A1 | 9/2020 | Chang et al. |

FOREIGN PATENT DOCUMENTS

| | | |
|---|---|---|
| CN | 102369474 A | 3/2012 |
| CN | 103192620 | 7/2013 |
| CN | 104144994 A | 11/2014 |
| CN | 105263353 A | 1/2016 |
| CN | 107404976 | 11/2017 |
| CN | 111511240 A | 8/2020 |
| CN | 111511241 A | 8/2020 |
| CN | 114642294 A | 6/2022 |
| CN | 114642295 A | 6/2022 |
| JP | 2002-088291 A2 | 3/2002 |
| WO | 9700736 A1 | 1/1997 |
| WO | 2009029641 A1 | 3/2009 |
| WO | 2014138573 A2 | 9/2014 |
| WO | 2016164549 A1 | 10/2016 |
| WO | 2017079255 A1 | 5/2017 |
| WO | 2019036190 A1 | 2/2019 |
| WO | 2019084367 A1 | 5/2019 |
| WO | 2019084382 A1 | 5/2019 |
| WO | 2020190518 A1 | 9/2020 |

OTHER PUBLICATIONS

International Search Report and Written Opinion for PCT/US2019/019714 mailed Apr. 24, 2019.
International Search Report and Written Opinion for PCT/US2020/021227 mailed Jul. 7, 2020.
International Preliminary Report on Patentability for PCT/US2020/021227 mailed Jun. 23, 2021.
SancureTM 20025F Polyurethane Dispersion product data sheet from Lubrizol (Year: 2021).
International Search Report and Written Opinion for PCT/US2018/057658 mailed Feb. 13, 2019.
International Search Report and Written Opinion for PCT/US2018/057681 mailed Jan. 30, 2019.
International Preliminary Report on Patentability for PCT/US2018/057658 mailed on Oct. 10, 2019.
Written Opinion for PCT/US2019/019714 mailed Aug. 4, 2020.
Written Opinion of the International Preliminary Examining Authority for PCT/US2020/021227 mailed Sep. 21, 2020.

(56) References Cited

OTHER PUBLICATIONS

International Preliminary Report on Patentability for PCT/US2018/057681 mailed on Oct. 7, 2019.

* cited by examiner

ARTICLES INCLUDING COATED FIBERS AND METHODS OF MAKING COATED FIBERS AND ARTICLES

CROSS-REFERENCE TO RELATED APPLICATIONS

This application is a continuation of U.S. application Ser. No. 17/886,399, filed on Aug. 11, 2022, having the title "ARTICLES INCLUDING COATED FIBERS AND METHODS OF MAKING COATED FIBERS AND ARTICLES," which is a continuation of U.S. application Ser. No. 17/065,419, filed on Oct. 7, 2020, now U.S. Pat. No. 11,464,281, having the title "ARTICLES INCLUDING COATED FIBERS AND METHODS OF MAKING COATED FIBERS AND ARTICLES," which is a continuation of U.S. application Ser. No. 16/171,610, filed on Oct. 26, 2018, now U.S. Pat. No. 10,980,310, having the title "ARTICLES INCLUDING COATED FIBERS AND METHODS OF MAKING COATED FIBERS AND ARTICLES," which claims the benefit of and priority to U.S. Provisional Application Ser. No. 62/724,260, filed on Aug. 29, 2018, having the title "ARTICLES INCLUDING COATED FIBERS AND METHODS OF MAKING COATED FIBERS AND ARTICLES," and to U.S. Provisional Application Ser. No. 62/712,683, filed on Jul. 31, 2018, having the title "ARTICLES AND METHODS OF MAKING ARTICLES INCLUDING A COATING," and to U.S. Provisional Application Ser. No. 62/617,665, filed on Jan. 16, 2018, having the title "COMPOSITE STRUCTURES AND METHODS OF MAKING COMPOSITE STRUCTURES," and to U.S. Provisional Application Ser. No. 62/577,904, filed on Oct. 27, 2017, having the title "BLADDERS AND METHODS OF MAKING BLADDERS," the disclosures which are incorporated herein by reference in their entireties.

BACKGROUND

Footwear, clothing, accessories, or athletic wear are often a source of expression for the wearer and can include colors to associate with a team, coordinate with another item, or provide the user with an attractive or customized item. Footwear can include uppers, midsoles and inflated bladders, or airbags, for cushioning, and each can be colored so as to be part of the source of expression.

DESCRIPTION

Figure 1:
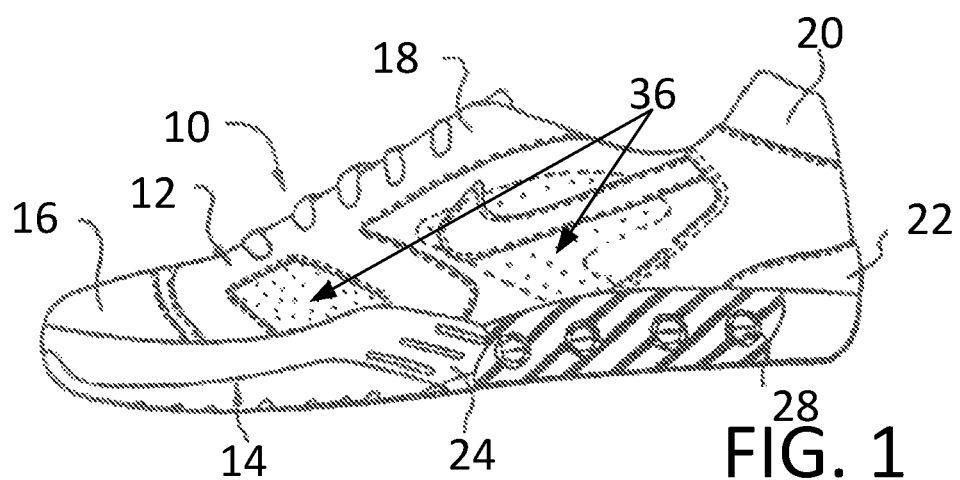
FIG. 1 illustrates a side elevational view of an athletic shoe.

The present disclosure is directed to articles that include one or more coated fiber(s) (i.e., fiber(s) with a cured coating disposed thereon), where the coating includes a matrix of crosslinked polymers and optionally a colorant (e.g., pigment particles or dye or both). The cured coating is a product of crosslinking a coating composition including uncrosslinked polymers (e.g., a dispersion of uncrosslinked polymers in a carrier, wherein the uncrosslinked polymers are crosslinked to form the matrix of crosslinked polymers). The matrix of crosslinked polymers can be elastomeric. The one or more coated fiber(s) can be formed by applying (e.g., spraying) the coating composition onto the surface of the one or more fiber(s) and then curing it on the one or more fiber(s), bonding the crosslinked polymeric matrix to the surface of the one or more fiber(s) and forming one or more coated fiber(s).

When the cured coating includes a colorant (e.g., when the coating composition includes a colorant), the cured coating can be used to give a desired color or appearance to the one or more fiber(s). When a colorant is included in the coating composition, the matrix of crosslinked polymers formed by curing the coating composition entraps the colorant and bonds the matrix including the colorant to the surface of the one or more fiber(s). It has been found the coating compositions and cured coatings disclosed herein bond particularly well to fibers formed of polymeric materials such as polyesters, polyethers, polyamides, polyolefins, and polyurethanes, including thermoplastic polyurethanes (TPUs). It has also been found that these coating compositions and cured coatings bond particularly well to man-made fibers formed of non-polymeric materials such as glass fibers and carbon fibers. The colorant can be a pigment such as metal and metal oxide pigments, carbon pigments, clay earth pigments, ultramarine pigments, and a combination thereof. The colorant can be a dye such as an acid dye, including acid dyes complexed with quaternary ammonium compounds. The dye can be dispersed or solubilized in the coating composition prior to disposing the coating composition onto the one or more fiber(s). The one or more coated fiber(s), as well as yarns and textiles including the one or more coated fiber(s), can be incorporated into an article, such as an article of footwear, a component of footwear, an article of apparel, a component of apparel, an article of sporting equipment, or a component of sporting equipment.

The coating composition comprises uncrosslinked polymers and optionally a colorant, such as a mixture of uncrosslinked polymers with pigment particles or dye or both, in a carrier, for example water or an aqueous solution. In a particular example, the uncrosslinked polymers of the coating composition include a water-borne dispersion of uncrosslinked polymers, such as a water-borne dispersion of uncrosslinked polyurethanes. It has been found that these coating compositions comprising water-borne dispersions of uncrosslinked polymers in a carrier, and cured coatings formed from these coating compositions, bond particularly well to fibers such as those made of polymeric materials as well as carbon fibers and glass fibers. It has also been found that when the cured coatings form an elastomeric matrix, it is particularly well-suited to use on articles which may flex during use, such as yarns, cables, textiles, and other elements including fibers. When pigments are included in the coating, the polymeric matrix traps at least a portion of the pigments in the cured coating. When a dye is included in the coating composition (e.g., a dispersed or solublized dye) or cured coating, following the curing step, the dye remains present in the crosslinked polymeric matrix of the cured coating. The high bonding strength with the crosslinked polymeric matrix, particularly when the cured coating is elastomeric, results in a durable decorative coating which can be used on articles of footwear, apparel and sporting equipment.

The disclosure is also directed to a composite article, where the composite article comprises a solid resin material (e.g., a solid thermoplastic material or a solid thermoset material such as an epoxy resin material) consolidating the one or more coated fiber(s) as disclosed herein. The composite article can be incorporated into articles such as footwear, apparel and sporting equipment. When present, the optional colorants (e.g., pigments or dye or both) impart color or decorative effects to the fiber(s) and the articles, which can be realized by coating one or more fiber(s) with the coating composition and curing the coating composition prior to consolidating the one or more fiber(s) with the solid resin material. It has been found that the coatings of the present disclosure remain bonded to the fibers when exposed to many different types of resin materials commonly used to form composites, rather than dissolving or dispersing in the resin materials. When substantially transparent or translucent solid resin materials are used, the coated fiber(s) can be visible through the solid resin material surrounding and consolidating the coated fiber(s).

According to the present disclosure, a method of making a composite article can comprise disposing a liquid resin material onto one or more coated fiber(s), wetting the one or more coated fiber(s) with the liquid resin material; and solidifying the liquid resin material, forming a solid resin material surrounding and consolidating the one or more coated fiber(s). The coating of the one or more coated fiber(s) can be an elastomeric coating, which can be beneficial when the composite article is configured to flex during use. The coating of the one or more coated fiber(s) can comprise a colorant such as a plurality of pigments entrapped in the crosslinked matrix. During the process of forming the composite element, the addition of the liquid resin material (e.g., a liquid uncured resin material or a molten thermoplastic resin material) to the coated fiber(s) does not substantially dissolve or disperse the crosslinked polymeric matrix of the cured coating, and so the cured coating, optionally including a colorant, remains bonded to the one or more coated fiber(s) in the composite article. The composite articles can be used in articles such as footwear, a component of footwear, apparel, a component of apparel, sporting equipment, or a component of sporting equipment, including in examples where the composite article is configured to flex, bend, twist, and the like during normal use.

The one or more coated fiber(s) of the present disclosure can include one or more natural fiber(s) or one or more man-made fiber(s) or both. The one or more man-made coated fiber(s) can include a thermoplastic polyurethane fiber, a thermoplastic polyamide fiber, a thermoplastic polyester fiber, a thermoplastic polyether fiber, and any combination thereof. The one or more man-made coated fiber(s) can include a glass fiber or a carbon fiber. The one or more natural or man-made coated fiber(s) can be present in a tow of fibers. The one or more natural or man-made coated fiber(s) can be present in the form of a yarn, including as such as a staple yarn including a spun staple yarn, or as a filament yarn, including a monofilament yarn. The plurality of fibers including the one or more coated fiber(s) in the article can be present in the form of a textile, such as a non-woven textile, a woven textile, a knit textile, a braided textile, or a crocheted textile.

The present disclosure also provides for a method of making an article that comprises: attaching (e.g., affixing, bonding, coupling, etc.) a first article as described above and herein to a second article. For example, the first and second articles can be components of an article of footwear, apparel or sporting equipment, and attaching the first and second articles together can result in a finished article of footwear, apparel or sporting equipment.

Now having described embodiments of the present disclosure generally, additional discussion regarding embodiments will be described in greater details.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of material science, chemistry, textiles, polymer chemistry, and the like, which are within the skill of the art. Such techniques are explained fully in the literature.

Unless otherwise defined, all technical and scientific terms used herein have the same meaning as commonly understood by one of ordinary skill in the art of material science, chemistry, textiles, polymer chemistry, and the like. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

In an embodiment of the present disclosure, the cured coating can be a crosslinked coating that optionally includes one or more colorants such as solid pigment particles or dye. The crosslinked coating can be a matrix of crosslinked polymers (e.g., a crosslinked polyurethane homopolymer or copolymer such as a crosslinked polyester polyurethane). The optional colorants can be entrapped in the coating, including entrapped in the matrix of crosslinked polymers. The pigment or dye can be physically entrapped in the crosslinked polymer matrix, can be chemically bonded (e.g., covalently bonded, ionically bonded, hydrogen bonded, and the like, with the coating including the polymeric matrix or with the material forming the surface of the fiber to which the coating is applied), or a combination of physically bonded and chemically bonded with the cured coating or fiber. The cured coating can have a thickness of about 0.01 micrometers to 1000 micrometers.

The cured coating can be a product (or also referred to as "crosslinked product") of crosslinking a coating composition comprising uncrosslinked polymers. In the coating composition, the uncrosslinked polymers can be dispersed in a carrier, such as an organic solvent, water or an aqueous solution. The uncrosslinked polymers can be a dispersion of uncrosslinked polymers including a water-borne dispersion of uncrosslinked polymers such as, for example, a water-borne dispersion of uncrosslinked polyurethane polymers, including a water-borne dispersion of uncrosslinked polyester polyurethane copolymers). The coating composition can include one or more colorants (e.g., pigments and/or or dyes). The uncrosslinked polymers can be crosslinked to form a crosslinked polymeric matrix which entraps the colorants. The colorants can be physically entrapped in the crosslinked polymeric matrix, can be chemically bonded (e.g., covalently bonded, ionically bonded, hydrogen bonded, and the like, with the crosslinked polymeric matrix), or can be both physically bonded and chemically bonded with the crosslinked polymeric matrix. The cured coating can be formed by crosslinking the coating composition. The cured coating can have a thickness of about 0.01 micrometers to 1000 micrometers on the one or more fiber(s).

The term "water-borne" herein means the carrier of the dispersion includes about 50 weight percent to 100 weight percent water, about 60 weight percent to 100 weight percent water, about 70 weight percent to 100 weight percent water, or about 100 weight percent water. The term "water-borne dispersion" refers to a dispersion of a component (e.g., polymer, cross-linker, and the like) in water without co-solvents. A co-solvent can be used in the water-borne dispersion and the co-solvent can be an organic solvent.

The one or more coated fiber(s) can be incorporated into a composite article that includes the one or more coated fiber(s), wherein the one or more coated fiber(s) are surrounded by and consolidated by a solid resin material. The solid resin material can be a thermoset cured resin material such as a cured epoxy resin material, or can be a re-flowed and solidified thermoplastic material. The composite article can be incorporated into an article such as footwear (e.g., as a plate or part of a plate) or apparel or sporting equipment. In this regard, one or more portions of the composite article can be visible (e.g., exposed) in the finished article (e.g., not covered) so that the one or more coated fiber(s), optionally including a colorant, of the composite article can be seen by a person observing the article.

The composite article is made by disposing a liquid resin material onto one or more coated fiber(s), wetting the one or more coated fiber(s) with a liquid resin material; and solidifying the liquid resin material surrounding and consolidating the one or more coated fiber(s) with solid resin material, forming a composite component. The liquid resin material can be a molten thermoplastic material which is solidified by cooling the thermoplastic material to a temperature below its melting temperature. The liquid resin material can be a reactive resin material which is solidified by polymerizing monomers and/or oligomers present in the liquid resin, or by crosslinking polymers present in the liquid resin, or both.

The composite article can be used in the sole of a shoe, where one or more portions of the composite article are exposed or can otherwise be seen through openings in the sole, through a transparent or translucent material forming a portion of the sole, or another portion of the article of footwear, as described below and herein. In a particular example, the one or more coated fibers can be included in a composite plate for an article of footwear where the solid resin material is substantially transparent, and the one or more coated fibers can be visible through the solid resin material forming at least a portion of a surface of the plate configured to be ground-facing during wear.

The one or more coated fiber(s), can be incorporated into a tow, a yarn or a cable, and can be used in fiber form or yarn form to form a textile. For example, a textile comprising the one or more coated fiber(s) can be used to form footwear or components thereof, apparel (e.g., shirts, jerseys, pants, shorts, gloves, glasses, socks, hats, caps, jackets, undergarments) or components thereof, containers (e.g., backpacks, bags), and upholstery for furniture (e.g., chairs, couches, car seats), bed coverings (e.g., sheets, blankets), table coverings, towels, flags, tents, sails, and parachutes. In addition, the one or more coated fiber(s) can be used to produce articles or other items that are disposed on the article, where the article can be striking devices (e.g., bats, rackets, sticks, mallets, golf clubs, paddles, etc.), athletic equipment (e.g., golf bags, baseball and football gloves, soccer ball restriction structures), protective equipment (e.g., pads, helmets, guards, visors, masks, goggles, etc.), locomotive equipment (e.g., bicycles, motorcycles, skateboards, cars, trucks, boats, surfboards, skis, snowboards, etc.), balls or pucks for use in various sports, fishing or hunting equipment, furniture, electronic equipment, construction materials, eyewear, timepieces, jewelry, and the like.

In regard to an article of footwear, the footwear can be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, and the like, whether as an athletic performance surface or as a general outdoor surface. However, the article of footwear may also be desirable for indoor applications, such as indoor sports including dirt playing surfaces for example (e.g., indoor baseball fields with dirt infields).

The article of footwear can be designed for use in outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes as well as tread patterns) to provide traction on soft and slippery surfaces. Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

FIG. 1 shows an article of footwear 10 including textile portions 36 including one or more coated fiber(s). The footwear 10 includes an upper 12 to which a sole 14 is attached. The upper 12 can be formed from a variety of conventional materials including, e.g., textiles including natural leathers, synthetic leathers, and other knit, woven and non-woven textiles. Typically, the upper 12 includes reinforcements located around the toe 16, the lacing eyelets 18, the top of the footwear 20 and along the heel area 22, which can also comprise one or more coated fiber(s) as disclosed herein. As with most articles of footwear, the sole 14 extends generally the entire length of the footwear 10 from the toe region 16 through the midfoot region 24 and back to the heel portion 22. The sole 14 includes one or more cushioning elements such as, for example, bladders 28 disposed in the mid-sole 26 of the sole structure. The bladder 28 can be formed having various geometries such as a plurality of tubular members positioned in a spaced apart, parallel relationship to each other within the heel region 22 of the mid-sole 26. The tubular members 28 are sealed bladders containing an injected captive gas. Optionally, the sealed bladder can include one or more coated fiber(s) in an interior void of the bladder. The one or more coated fiber(s) can be a spacer textile affixed to one or more bladder walls of the bladder. Alternatively, the cushioning elements can be formed of foamed polymeric materials. Textile portions 36, 16, 18, 20, 22 or any combination thereof, can comprise one or more coated fiber(s), or other portions of the footwear, or substantially all exposed fibers of the article of footwear can include the coated fibers, even within the bladder.

Figure 2A:
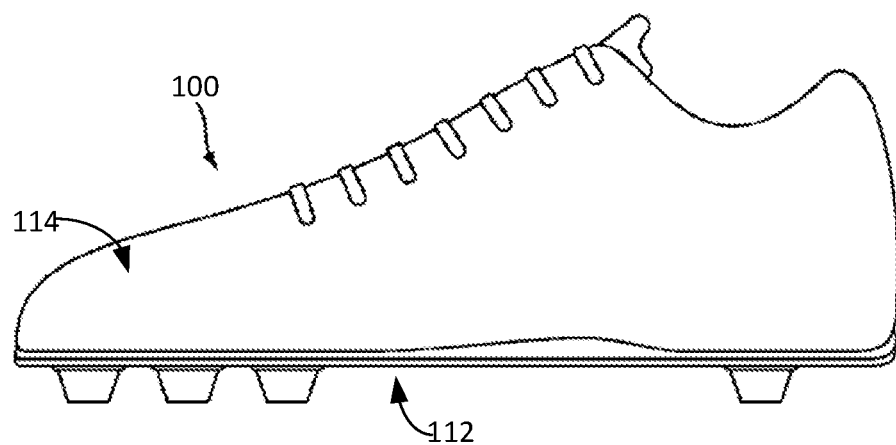
FIGS. 2A and 2B illustrate cleated footwear includes aspects of the present disclosure.
Figure 2B:
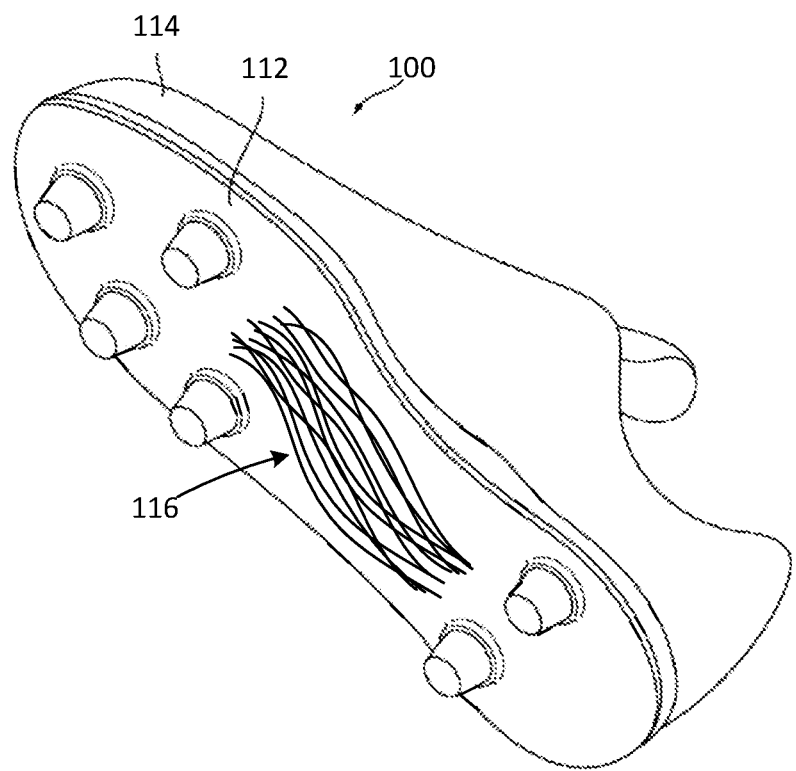

The composite article can be incorporated into footwear as shown in FIGS. 2A and 2B. The composite article 112 can be incorporated into a sole of an article of footwear 100 which can be attached (e.g., affixed, bonded, coupled, etc.) to an upper 114 as well as other components to form the article of footwear 100. The sole and/or upper can be designed so that one or more portions of the composite article 112 are visible. For example, the composite article may not be covered up or may include an opening, or otherwise expose the composite article so that the one or more coated fibers(s) 116 forming the composite article 112 can be seen. The solid resin material of the composite article can be substantially transparent, such that the one or more coated fiber(s) surrounded by and consolidated by the solid resin material are visible through the solid resin material. The composite structure 112 can be a plate in the sole of an article of footwear 100 and is visible on or through a surface of the article of footwear 10, including a surface of the article of footwear 100 configured to be ground-facing.

The composite article can be the plate or part of the plate and can optionally include a plurality of traction elements. When worn, traction elements provide traction to a wearer so as to enhance stability. One or more of the traction elements can be integrally formed with the plate or can be removable. The article of footwear can be a cleated article of footwear for use in sports such as soccer, football, baseball, softball, lacrosse, and the like.

Figure 3:
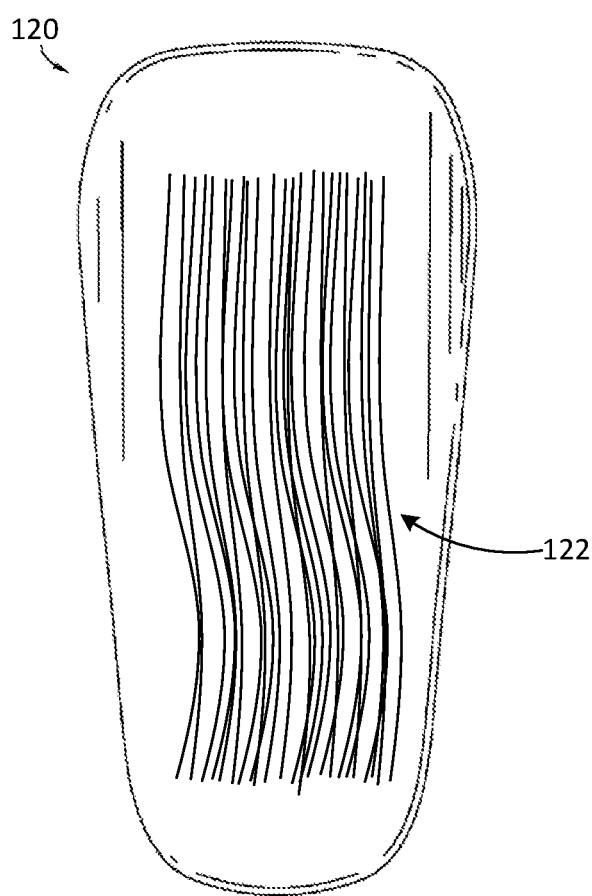
FIG. 3 illustrates a shin guard that includes aspects of the present disclosure.

The composite article can be incorporated into protective gear such as a shin guard shown in FIG. 3. The shin guard 120 includes the composite article that includes the one or more coated fiber(s) 122. The shin guard 120 can be designed so that one or more portions of the composite structure including the one or more coated fiber(s) 122 are visible on or through a surface of the final article. The solid resin material of the composite article can be substantially transparent, such that the one or more coated fiber(s) surrounded by and consolidated by the solid resin material are visible through the solid resin material. For example, the composite article may not be covered up, or the final article may include an opening, or otherwise expose of the one or more coated fiber(s) of the composite article 122, so that the one or more coated fiber(s) can be seen.

As described briefly above, the one or more coated fiber(s) can include the cured coating on an outside surface of the one or more fiber(s). The cured coating can be chemically bonded (e.g., covalently bonded, ionically bonded, hydrogen bonded, and the like) to the surface of the fiber(s). The cured coating has been found to bond well to the surface of the fiber(s), in particular when the surface of the fiber(s) is made of a polymeric material. In an example, the surface of the fiber(s) can be made of a polymeric material such as a polyester, a polyether, a polyamide, a polyolefin, or a polyurethane (e.g., TPU). The coated fiber(s) can be incorporated into or part of an article and the cured coating can be on a surface of one or more parts of the article (e.g., the midsole, the upper, etc. of an article of footwear) that can be observed from a person viewing the article. The presence of the coating on the coated fiber(s) can provide a distinctive or aesthetically pleasing effect on the article.

The article, component of an article, or the composite article can include transparent or translucent portions so that the coated fiber(s) is visible. As used herein, a transparent material means that light passes through the material in straight lines and passes out of the material and one can see clearly through the material to observe the coated fiber(s). For an opaque material, light does not pass through the material and one cannot see through the material at all. Translucent material falls between a transparent material and an opaque material, in that light passes through a translucent material but some of the light is scattered so that one cannot see clearly through the material. The wavelength and amount of light passing through a material can be measured using a spectrophotometer, for example.

The coating composition and cured coating can include colorants such a pigment (e.g., a solid pigment particle) or a dye. The solid pigment particles can include inorganic pigments such as metal and metal oxides such as homogeneous inorganic pigments, core-shell pigments and the like, as well as carbon pigments (e.g., carbon black), clay earth pigments, and ultramarine pigments. The solid pigment particles can be biological or organic pigments. The solid pigment particles can be of a type known in the art as an extender pigment, which include, but are not limited to, calcium carbonate, calcium silicate, mica, clay, silica, barium sulfate and the like. The amount of the solid pigment particles sufficient to achieve the desired color intensity, shade, and opacity, can be in amounts up to about 5 percent to 25 percent or more by weight of the coating. The pigments can include those sold by KP Pigments such as pearl pigments, color shift pigments (e.g., CALYPSO, JEDI, VERO, BLACKHOLE, LYNX, ROSE GOLD, and the like), hypershift pigments, interference pigments and the like.

The colorant can be a dye such as an anionic dye, a cationic dye, a direct dye, a metal complex dye, a basic dye, a disperse dye, a solvent dye, a polymeric dye, a polymeric dye colorant, or a nonionic dye, where the coating can include one or more dyes and/or types of dyes. The dye can be a water-miscible dye. The dye can be a solubilized dye. The anionic dye can be an acid dye. The dye can be applied separately from the coating (e.g., either before or after the coating is applied and/or cured).

Acid dyes are water-soluble anionic dyes. Acid dyes are available in a wide variety, from dull tones to brilliant shades. Chemically, acid dyes include azo, anthraquinone and triarylmethane compounds. The "Color Index" (C.I.), published jointly by the Society of Dyers and Colourists (UK) and by the American Association of Textile Chemists and Colorists (USA), is the most extensive compendium of dyes and pigments for large scale coloration purposes, including 12000 products under 2000 C.I. generic names. In the C.I. each compound is presented with two numbers referring to the coloristic and chemical classification. The "generic name" refers to the field of application and/or method of coloration, while the other number is the "constitution number." Examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the ink composition.

Acid dyes and nonionic disperse dyes are commercially available from many sources, including Dystar L.P., Charlotte, NC under the tradename TELON, Huntsman Corporation, Woodlands, TX, USA under the tradename ERIONYL and TECTILON, BASF SE, Ludwigshafen, Germany under the tradename BASACID, and Bezema AG, Montlingen, Switzerland under the tradename Bemacid.

The colorant can include the dye and a quaternary ammonium salt (e.g., quaternary (tetraalkyl) ammonium salt), in particular when the dye is acidic dye. The quaternary salt can be include four groups attached to the N atom, wherein the each can be selected independently from a hydrocarbon group R (e.g., R can be an alkyl group such as a C1 to C6 alkyl group) or non-hydrocarbon chains such as ether (—C(O)—R1 (e.g., R1 can be an alkyl group such as a C1 to C6 alkyl group)), ester (—C(O)—O—R1 (e.g., R1 can be an alkyl group such as a C1 to C6 alkyl group)) and amide (—C(O)—NR1 R2 (e.g., R1 and R2 can each independently be an alkyl group such as a C1 to C6 alkyl group)). The quaternary (tetraalkyl) ammonium salt can react with the dye (e.g., acid dye) to form a complexed dye that can be used in the coating. The "alkyl" group can include C1 to C10 alkyl groups. The quaternary (tetraalkyl) ammonium salt can be selected from soluble tetrabutylammonium compounds and tetrahexylammonium compounds. The counterion of the quaternary ammonium salt should be selected so that the quaternary ammonium salt forms a stable solution with the dye (e.g., anionic dye). The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexfluorophosphite, borate, tetrafluoroborate, cyanide, isocyanide, azide, thiosulfate, thiocyanate, or carboxylate (such as acetate or oxalate). The tetraalkylammonium compound can be or include a tetrabutylammonium halide or tetrahexylammonium halide, particularly a tetrabutylammonium bromide or chloride or a tetrahexylammonium bromide or chloride. The cured coating and the coating composition (prior to curing) can include about 1 to 15 weight percent of the quaternary ammonium salt. The molar ratio of the acid dye to the quaternary ammonium compound can range from about 4:1 to 1:4 or about 1.5:1 to 1.1.5.

In an aspect, the cured coating and the coating composition (prior to curing) (e.g., monomers and/or polymers of the matrix of crosslinked polymers, or precursors of the coating) can include a cross-linker, which functions to crosslink the polymeric components of the coating. The cross-linker can be a water-borne cross-linker. The cross-linker can include one or more of the following: a polycarboxylic acid cross-linking agent, an aldehyde crosslinking agent, a polyisocyanate crosslinking agent, or a combination thereof. The polycarboxylic acid crosslinking agent can be a polycarboxylic acid having from 2 to 9 carbon atoms. For example, the cross-linker can include a polyacrylic acid, a polymaleic acid, a copolymer of acid, a copolymer of maleic acid, fumaric acid, or 1, 2, 3, 4-butanetetracarboxylic acid. The concentration of the cross-linker can be about 0.01 to 5 weight percent or 1 to 3 weight percent of the coating.

The coating composition (prior to curing) (e.g., monomers and/or polymers of the matrix of crosslinked polymers, or precursors of the coating) can include a solvent. The solvent can be an organic solvent. The organic solvent can be a water-miscible organic solvent. The coating may not include water, or may be essentially free of water. For example, the solvent can be or includes acetone, ethanol, 2-propanol, ethyl acetate, isopropyl acetate, methanol, methyl ethyl ketone, 1-butanol, t-butanol, or any mixture thereof.

Now having described aspects of the present disclosure generally, additional details regarding the polymer chemistry of the coating composition, cured coating, fibers, yarns, and the like are provided. The uncured coating compositions of the present disclosure comprise uncrosslinked polymers, alone or optionally in combination with unpolymerized monomers and/or oligomers, as described below. The liquid resin material of the composite articles comprises uncrosslinked polymers and/or unpolymerized monomers and/or unpolymerized oligomers as described below. The solid resin material of the composite articles comprises polymers, optionally crosslinked polymers, as described below. Additionally, the fiber(s) of the present disclosure can be polymeric fibers formed from polymeric materials comprising polymers as described below. Additional components of the articles described herein can include polymeric materials comprising polymers as described below.

The polymer can be a thermoset polymer or a thermoplastic polymer. The polymer can be an elastomeric polymer, including an elastomeric thermoset polymer or an elastomeric thermoplastic polymer. The polymer can be selected from: polyurethanes (including elastomeric polyurethanes, thermoplastic polyurethanes (TPUs), and elastomeric TPUs), polyesters, polyethers, polyamides, vinyl polymers (e.g., copolymers of vinyl alcohol, vinyl esters, ethylene, acrylates, methacrylates, styrene, and so on), polyacrylonitriles, polyphenylene ethers, polycarbonates, polyureas, polystyrenes, co-polymers thereof (including polyester-polyurethanes, polyether-polyurethanes, polycarbonate-polyurethanes, polyether block polyamides (PEBAs), and styrene block copolymers), and any combination thereof, as described herein. The polymer can include one or more polymers selected from the group consisting of polyesters, polyethers, polyamides, polyurethanes, polyolefins copolymers of each, and combinations thereof.

The term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as hard segments include segments including a urethane linkage, which can be formed from reacting an isocyanate with a polyol to form a polyurethane. Examples of segments often referred to as soft segments include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

As previously described, the polymer can be a thermoplastic polymer. In general, a thermoplastic polymer softens or melts when heated and returns to a solid state when cooled. The thermoplastic polymer transitions from a solid state to a softened state when its temperature is increased to a temperature at or above its softening temperature, and a liquid state when its temperature is increased to a temperature at or above its melting temperature. When sufficiently cooled, the thermoplastic polymer transitions from the softened or liquid state to the solid state. As such, the thermoplastic polymer may be softened or melted, molded, cooled, re-softened or re-melted, re-molded, and cooled again through multiple cycles. For amorphous thermoplastic polymers, the solid state is understood to be the "rubbery" state above the glass transition temperature of the polymer. The thermoplastic polymer can have a melting temperature from about 90 degrees C. to about 190 degrees C. when determined in accordance with ASTM D3418-97 as described herein below, and includes all subranges therein in increments of 1 degree. The thermoplastic polymer can have a melting temperature from about 93 degrees C. to about 99 degrees C. when determined in accordance with ASTM D3418-97 as described herein below. The thermoplastic polymer can have a melting temperature from about 112 degrees C. to about 118 degrees C. when determined in accordance with ASTM D3418-97 as described herein below.

The glass transition temperature is the temperature at which an amorphous polymer transitions from a relatively brittle "glassy" state to a relatively more flexible "rubbery" state. The thermoplastic polymer can have a glass transition temperature from about −20 degrees C. to about 30 degrees C. when determined in accordance with ASTM D3418-97 as described herein below. The thermoplastic polymer can have a glass transition temperature (from about −13 degree C. to about −7 degrees C. when determined in accordance with ASTM D3418-97 as described herein below. The thermoplastic polymer can have a glass transition temperature from about 17 degrees C. to about 23 degrees C. when determined in accordance with ASTM D3418-97 as described herein below.

The thermoplastic polymer can have a melt flow index from about 10 to about 30 cubic centimeters per 10 minutes ($cm^3/10$ min) when tested in accordance with ASTM D1238-13 as described herein below at 160 degrees C. using a weight of 2.16 kilograms (kg). The thermoplastic polymer can have a melt flow index from about 22 $cm^3/10$ min to about 28 $cm^3/10$ min when tested in accordance with ASTM D1238-13 as described herein below at 160 degrees C. using a weight of 2.16 kg.

The thermoplastic polymer can have a cold Ross flex test result of about 120,000 to about 180,000 cycles without cracking or whitening when tested on a thermoformed plaque of the thermoplastic polymer in accordance with the cold Ross flex test as described herein below. The thermoplastic polymer can have a cold Ross flex test result of about 140,000 to about 160,000 cycles without cracking or whitening when tested on a thermoformed plaque of the thermoplastic polymer in accordance with the cold Ross flex test as described herein below.

The thermoplastic polymer can have a modulus from about 5 megaPascals (MPa) to about 100 MPa when determined on a thermoformed plaque in accordance with ASTM D412-98 Standard Test Methods for Vulcanized Rubber and Thermoplastic Rubbers and Thermoplastic Elastomers-Tension with modifications described herein below. The thermoplastic polymer can have a modulus from about 20 MPa to about 80 MPa when determined on a thermoformed plaque in accordance with ASTM D412-98 Standard Test Methods for Vulcanized Rubber and Thermoplastic Rubbers and Thermoplastic Elastomers-Tension with modifications described herein below.

The polymer can be a thermoset polymer. As used herein, a "thermoset polymer" is understood to refer to a polymer which cannot be heated and melted, as its melting temperature is at or above its decomposition temperature. A "thermoset material" refers to a material which comprises at least one thermoset polymer. The thermoset polymer and/or thermoset material can be prepared from a precursor (e.g., uncured or partially cured polymer or material) using thermal energy and/or actinic radiation (e.g., ultraviolet radiation, visible radiation, high energy radiation, infrared radiation) to form a partially cured or fully cured polymer or material which no longer remains fully thermoplastic. In some cases, the cured or partially cured polymer or material may remain thermoelastic properties, in that it is possible to partially soften and mold the polymer or material at elevated temperatures and/or pressures, but it is not possible to melt the polymer or material. The curing can be promoted, for example, with the use of high pressure and/or a catalyst. In many examples, the curing process is irreversible since it results in cross-linking and/or polymerization reactions of the precursors. The uncured or partially cured polymers or materials can be malleable or liquid prior to curing. In some cases, the uncured or partially cured polymers or materials can be molded into their final shape, or used as adhesives. Once hardened, a thermoset polymer or material cannot be re-melted in order to be reshaped. The textured surface can be formed by partially or fully curing an uncured precursor material to lock in the textured surface of the textured structure.

Polyurethane

The polymer can be a polyurethane, such as a thermoplastic polyurethane (also referred to as "TPU"). Alternatively, the polymer can be a thermoset polyurethane. Additionally, polyurethane can be an elastomeric polyurethane, including an elastomeric TPU or an elastomeric thermoset polyurethane. The elastomeric polyurethane can include hard and soft segments. The hard segments can comprise or consist of urethane segments (e.g., isocyanate-derived segments). The soft segments can comprise or consist of alkoxy segments (e.g., polyol-derived segments including polyether segments, or polyester segments, or a combination of polyether segments and polyester segments). The polyurethane can comprise or consist essentially of an elastomeric polyurethane having repeating hard segments and repeating soft segments.

One or more of the polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, mono-functional isocyanates can also be optionally included, e.g., as chain terminating units).

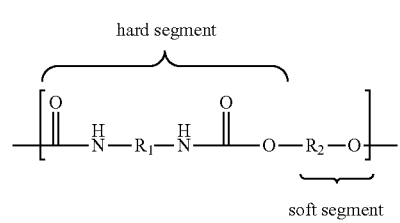

(Formula 1)

Each $R_1$ group and $R_2$ group independently is an aliphatic or aromatic group. Optionally, each $R_2$ can be a relatively hydrophilic group, including a group having one or more hydroxyl groups.

Additionally, the isocyanates can also be chain extended with one or more chain extenders to bridge two or more isocyanates, increasing the length of the hard segment. This can produce polyurethane polymer chains as illustrated below in Formula 2, where $R_3$ includes the chain extender. As with each $R_1$ and $R_3$, each $R_3$ independently is an aliphatic or aromatic functional group.

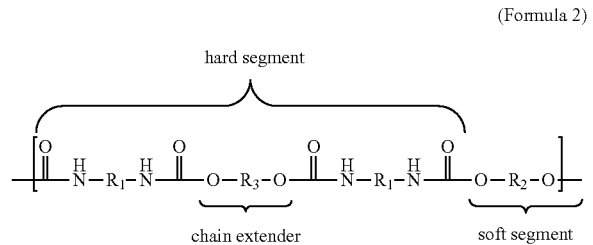

(Formula 2)

Each $R_1$ group in Formulas 1 and 2 can independently include a linear or branched group having from 3 to 30 carbon atoms, based on the particular isocyanate(s) used, and can be aliphatic, aromatic, or include a combination of aliphatic portions(s) and aromatic portion(s). The term "aliphatic" refers to a saturated or unsaturated organic molecule or portion of a molecule that does not include a cyclically conjugated ring system having delocalized pi electrons. In comparison, the term "aromatic" refers to an organic molecule or portion of a molecule having a cyclically conjugated ring system with delocalized pi electrons, which exhibits greater stability than a hypothetical ring system having localized pi electrons.

Each $R_1$ group can be present in an amount of about 5 percent to about 85 percent by weight, from about 5 percent to about 70 percent by weight, or from about 10 percent to about 50 percent by weight, based on the total weight of the reactant compounds or monomers which form the polymer.

In aliphatic embodiments (from aliphatic isocyanate(s)), each $R_1$ group can include a linear aliphatic group, a branched aliphatic group, a cycloaliphatic group, or combinations thereof. For instance, each $R_1$ group can include a linear or branched alkylene group having from 3 to 20 carbon atoms (e.g., an alkylene having from 4 to 15 carbon atoms, or an alkylene having from 6 to 10 carbon atoms), one or more cycloalkylene groups having from 3 to 8 carbon atoms (e.g., cyclopropyl, cyclobutyl, cyclopentyl, cyclohexyl, cycloheptyl, or cyclooctyl), and combinations thereof. The term "alkene" or "alkylene" as used herein refers to a bivalent hydrocarbon. When used in association with the term Cn it means the alkene or alkylene group has "n" carbon atoms. For example, 01-6 alkylene refers to an alkylene group having, e.g., 1, 2, 3, 4, 5, or 6 carbon atoms.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MD1), diisocyanatododecane, lysine diisocyanate, and combinations thereof.

The isocyanate-derived segments can include segments derived from aliphatic diisocyanate. A majority of the isocyanate-derived segments can comprise segments derived from aliphatic diisocyanates. At least 90 pecent of the isocyanate-derived segments are derived from aliphatic diisocyanates. The isocyanate-derived segments can consist essentially of segments derived from aliphatic diisocyanates. The aliphatic diisocyanate-derived segments can be derived substantially (e.g., about 50 percent or more, about 60 percent or more, about 70 percent or more, about 80 percent or more, about 90 percent or more) from linear aliphatic diisocyanates. At least 80 percent of the aliphatic diisocyanate-derived segments can be derived from aliphatic diisocyanates that are free of side chains. The segments derived from aliphatic diisocyanates can include linear aliphatic diisocyanates having from 2 to 10 carbon atoms.

When the isocyanate-derived segments are derived from aromatic isocyanate(s)), each $R_1$ group can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. The polymer chains can be substantially free of aromatic groups.

The polyurethane polymer chains can be produced from diisocyanates including HMDI, TDI, MDI, $H_{12}$ aliphatics, and combinations thereof. For example, the polyurethane can comprise one or more polyurethane polymer chains produced from diisocyanates including HMDI, TDI, MDI, $H_{12}$ aliphatics, and combinations thereof.

Polyurethane chains which are at least partially crosslinked or which can be crosslinked, can be used in accordance with the present disclosure. It is possible to produce crosslinked or crosslinkable polyurethane chains by reacting multi-functional isocyanates to form the polyurethane. Examples of suitable triisocyanates for producing the polyurethane chains include TDI, HDI, and IPDI adducts with trimethyloylpropane (TMP), uretdiones (i.e., dimerized isocyanates), polymeric MDI, and combinations thereof.

The $R_3$ group in Formula 2 can include a linear or branched group having from 2 to 10 carbon atoms, based on the particular chain extender polyol used, and can be, for example, aliphatic, aromatic, or an ether or polyether. Examples of suitable chain extender polyols for producing the polyurethane include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1, 4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

The $R_2$ group in Formula 1 and 2 can include a polyether group, a polyester group, a polycarbonate group, an aliphatic group, or an aromatic group. Each $R_2$ group can be present in an amount of about 5 percent to about 85 percent by weight, from about 5 percent to about 70 percent by weight, or from about 10 percent to about 50 percent by weight, based on the total weight of the reactant monomers.

At least one $R_2$ group of the polyurethane includes a polyether segment (i.e., a segment having one or more ether groups). Suitable polyether groups include, but are not limited to, polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. When used in association with the term Cn it means the alkyl group has "n" carbon atoms. For example, 04 alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the polyurethane, the at least one $R_2$ group includes a polyester group. The polyester group can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol, 1,5-diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester group also can be derived from polycarbonate prepolymers, such as poly(hexamethylene carbonate) glycol, poly(propylene carbonate) glycol, poly(tetramethylene carbonate)glycol, and poly (nonanemethylene carbonate) glycol. Suitable polyesters can include, for example, polyethylene adipate (PEA), poly (1,4-butylene adipate), poly(tetramethylene adipate), poly (hexamethylene adipate), polycaprolactone, polyhexamethylene carbonate, poly(propylene carbonate), poly (tetramethylene carbonate), poly(nonanemethylene carbonate), and combinations thereof.

At least one $R_2$ group can include a polycarbonate group. The polycarbonate group can be derived from the reaction of one or more dihydric alcohols (e.g., ethylene glycol, 1,3-propylene glycol, 1,2-propylene glycol, 1,4-butanediol, 1,3-butanediol, 2-methylpentanediol 1,5-diethylene glycol, 1,5-pentanediol, 1,5-hexanediol, 1,2-dodecanediol, cyclohexanedimethanol, and combinations thereof) with ethylene carbonate.

The aliphatic group can be linear and can include, for example, an alkylene chain having from 1 to 20 carbon atoms or an alkenylene chain having from 1 to 20 carbon atoms (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkene" or "alkylene" refers to a bivalent hydrocarbon. The term "alkenylene" refers to a bivalent hydrocarbon molecule or portion of a molecule having at least one double bond.

The aliphatic and aromatic groups can be substituted with one or more pendant relatively hydrophilic and/or charged groups. The pendant hydrophilic group can include one or more (e.g., 2, 3, 4, 5, 6, 7, 8, 9, 10 or more) hydroxyl groups. The pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

The $R_2$ group can include charged groups that are capable of binding to a counterion to ionically crosslink the polymer and form ionomers. For example, $R_2$ is an aliphatic or aromatic group having pendant amino, carboxylate, sulfonate, phosphate, ammonium, or zwitterionic groups, or combinations thereof.

When a pendant hydrophilic group is present, the pendant hydrophilic group can be at least one polyether group, such as two polyether groups. In other cases, the pendant hydrophilic group is at least one polyester. The pendant hydrophilic group can be a polylactone group (e.g., polyvinylpyrrolidone). Each carbon atom of the pendant hydrophilic group can optionally be substituted with, e.g., an alkyl group having from 1 to 6 carbon atoms. The aliphatic and aromatic groups can be graft polymeric groups, wherein the pendant groups are homopolymeric groups (e.g., polyether groups, polyester groups, polyvinylpyrrolidone groups).

The pendant hydrophilic group can be a polyether group (e.g., a polyethylene oxide (PEO) group, a polyethylene glycol (PEG) group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., one having from 1 to 20 carbon atoms) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. The linker can be 4,4'-diphenylmethane diisocyanate (MDI), as shown below.

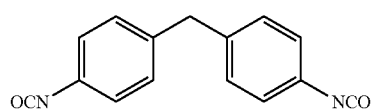

(Formula 3)

The pendant hydrophilic group can be a polyethylene oxide group and the linking group can be MDI, as shown below.

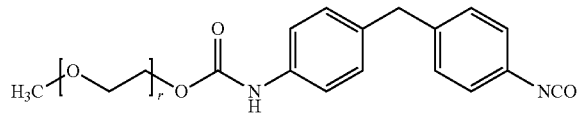

(Formula 4)

The pendant hydrophilic group can be functionalized to enable it to bond to the aliphatic or aromatic group, optionally through the linker. For example, when the pendant hydrophilic group includes an alkene group, which can undergo a Michael addition with a sulfhydryl-containing bifunctional molecule (i.e., a molecule having a second reactive group, such as a hydroxyl group or amino group), resulting in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

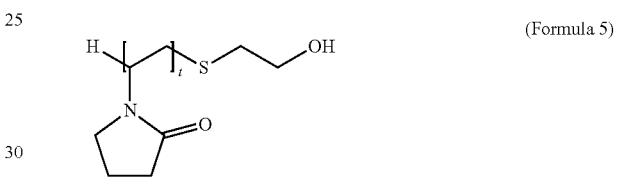

(Formula 5)

At least one $R_2$ group in the polyurethane can include a polytetramethylene oxide group. At least one $R_2$ group of the polyurethane can include an aliphatic polyol group functionalized with a polyethylene oxide group or polyvinylpyrrolidone group, such as the polyols described in E.P. Patent No. 2 462 908, which is hereby incorporated by reference. For example, the $R_2$ group can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

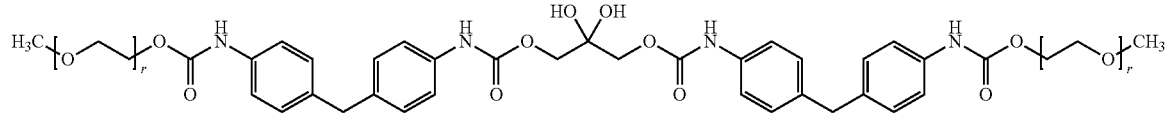

(Formula 6)

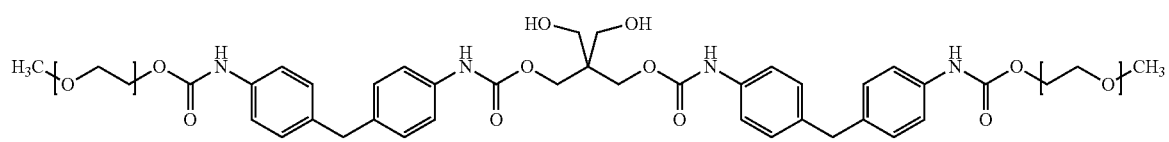

(Formula 7)

(Formula 8)

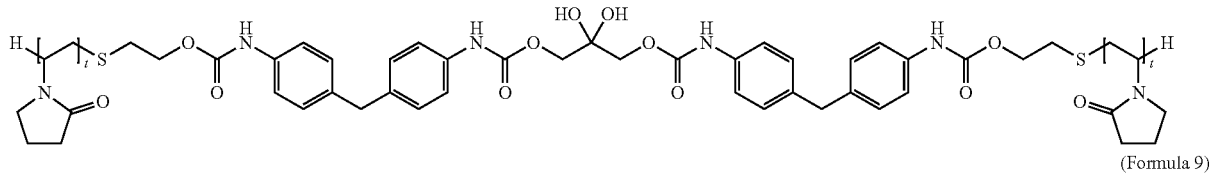

(Formula 9)

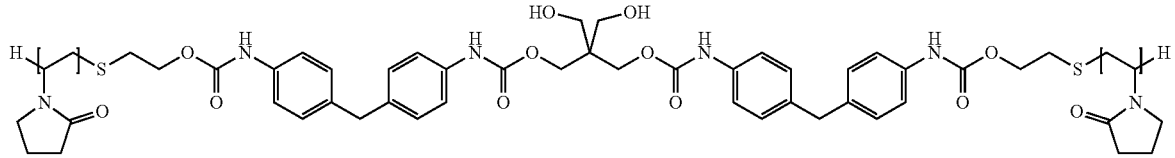

At least one $R_2$ of the polyurethane can be a polysiloxane, In these cases, the $R_2$ group can be derived from a silicone monomer of Formula 10, such as a silicone monomer disclosed in U.S. Pat. No. 5,969,076, which is hereby incorporated by reference:

(Formula 10)

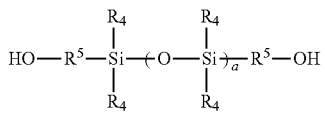

wherein: a is 1 to 10 or larger (e.g., 1, 2, 3, 4, 5, 6, 7, 8, 9, or 10); each $R_4$ independently is hydrogen, an alkyl group having from 1 to 18 carbon atoms, an alkenyl group having from 2 to 18 carbon atoms, aryl, or polyether; and each $R_5$ independently is an alkylene group having from 1 to 10 carbon atoms, polyether, or polyurethane.

Each $R_4$ group can independently be a H, an alkyl group having from 1 to 10 carbon atoms, an alkenyl group having from 2 to 10 carbon atoms, an aryl group having from 1 to 6 carbon atoms, polyethylene, polypropylene, or polybutylene group. Each $R_4$ group can independently be selected from the group consisting of methyl, ethyl, n-propyl, iso-propyl, n-butyl, isobutyl, s-butyl, t-butyl, ethenyl, propenyl, phenyl, and polyethylene groups.

Each $R_5$ group can independently include an alkylene group having from 1 to 10 carbon atoms (e.g., a methylene, ethylene, propylene, butylene, pentylene, hexylene, heptylene, octylene, nonylene, or decylene group). Each $R_5$ group can be a polyether group (e.g., a polyethylene, polypropylene, or polybutylene group). Each $R_5$ group can be a polyurethane group.

Optionally, the polyurethane can include an at least partially crosslinked polymeric network that includes polymer chains that are derivatives of polyurethane. The level of crosslinking can be such that the polyurethane retains thermoplastic properties (i.e., the crosslinked thermoplastic polyurethane can be melted and re-solidified under the processing conditions described herein). The crosslinked polyurethane can be a thermoset polymer. This crosslinked polymeric network can be produced by polymerizing one or more isocyanates with one or more polyamino compounds, polysulfhydryl compounds, or combinations thereof, as shown in Formulas 11 and 12, below:

(Formula 11)

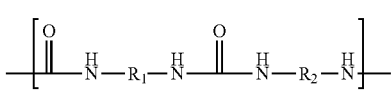

(Formula 12)

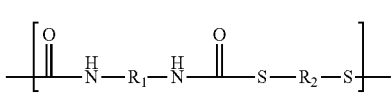

wherein the variables are as described above. Additionally, the isocyanates can also be chain extended with one or more polyamino or polythiol chain extenders to bridge two or more isocyanates, such as previously described for the polyurethanes of Formula 2.

The polyurethane chain can be physically crosslinked to another polyurethane chain through e.g., nonpolar or polar interactions between the urethane or carbamate groups of the polymers (the hard segments). The $R_1$ group in Formula 1, and the $R_1$ and $R_3$ groups in Formula 2, form the portion of the polymer often referred to as the "hard segment", and the $R_2$ group forms the portion of the polymer often referred to as the "soft segment". The soft segment is covalently bonded to the hard segment. The polyurethane having physically crosslinked hard and soft segments can be a hydrophilic polyurethane (i.e., a polyurethane, including a thermoplastic polyurethane, including hydrophilic groups as disclosed herein).

The polyurethane can be a thermoplastic polyurethane composed of MDI, PTMO, and 1,4-butylene glycol, as described in U.S. Pat. No. 4,523,005. Commercially available polyurethanes suitable for the present use include, but are not limited to those under the tradename "SANCURE" (e.g., the "SANCURE" series of polymer such as "SANCURE" 20025F) or "TECOPHILIC" (e.g., TG-500, TG-2000, SP-80A-150, SP-93A-100, SP-60D-60) (Lubrizol, Countryside, IL, USA), "PELLETHANE" 2355-85ATP and 2355-95AE (Dow Chemical Company of Midland, MI, USA.), "ESTANE" (e.g., ALR G 500, or 58213; Lubrizol, Countryside, IL, USA).

One or more of the polyurethanes (e.g., those used in the primer as the coating (e.g., water-dispersible polyurethane)) can be produced by polymerizing one or more isocyanates with one or more polyols to produce copolymer chains having carbamate linkages (—N(C=O)O—) and one or more water-dispersible enhancing moieties, where the polymer chain includes one or more water-dispersible enhancing moieties (e.g., a monomer in polymer chain). The water-dispersible polyurethane can also be referred to as "a water-borne polyurethane polymer dispersion." The water-dispersible enhancing moiety can be added to the chain of Formula 1 or 2 (e.g., within the chain and/or onto the chain as a side chain). Inclusion of the water-dispersible enhancing moiety enables the formation of a water-borne polyurethane dispersion. The term "water-borne" herein means the continuous phase of the dispersion or formulation of about 50 weight percent to 100 weight percent water, about 60 weight percent to 100 weight percent water, about 70 weight percent to 100 weight percent water, or about 100 weight percent water. The term "water-borne dispersion" refers to a dispersion of a component (e.g., polymer, cross-linker, and the like) in water without co-solvents. The co-solvent can be used in the water-borne dispersion and the co-solvent can be an organic solvent. Additional detail regarding the polymers, polyurethanes, isocyantes and the polyols are provided below.

The polyurethane (e.g., a water-borne uncrosslinked polyurethane polymer dispersion) can include one or more water-dispersible enhancing moieties. The water-dispersible enhancing moiety can have at least one hydrophilic (e.g., poly(ethylene oxide)), ionic or potentially ionic group to assist dispersion of the polyurethane, thereby enhancing the stability of the dispersions. A water-dispersible polyurethane can be formed by incorporating a moiety bearing at least one hydrophilic group or a group that can be made hydrophilic (e.g., by chemical modifications such as neutralization) into the polymer chain. For example, these compounds can be nonionic, anionic, cationic or zwitterionic or the combination thereof. In one example, anionic groups such as carboxylic acid groups can be incorporated into the chain in an inactive form and subsequently activated by a salt-forming compound, such as a tertiary amine. Other water-dispersible enhancing moieties can also be reacted into the backbone through urethane linkages or urea linkages, including lateral or terminal hydrophilic ethylene oxide or ureido units.

The water-dispersible enhancing moiety can be a one that includes carboxyl groups. Water-dispersible enhancing moiety that include a carboxyl group can be formed from hydroxy-carboxylic acids having the general formula (HO)$_x$Q(COOH)$_y$, where Q can be a straight or branched bivalent hydrocarbon radical containing 1 to 12 carbon atoms, and x and y can each independently be 1 to 3. Illustrative examples include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof.

The water-dispersible enhancing moiety can include reactive polymeric polyol components that contain pendant anionic groups that can be polymerized into the backbone to impart water dispersible characteristics to the polyurethane. Anionic functional polymeric polyols can include anionic polyester polyols, anionic polyether polyols, and anionic polycarbonate polyols, where additional detail is provided in U.S. Pat. No. 5,334,690.

The water-dispersible enhancing moiety can include a side chain hydrophilic monomer. For example, the water-dispersible enhancing moiety including the side chain hydrophilic monomer can include alkylene oxide polymers and copolymers in which the alkylene oxide groups have from 2-10 carbon atoms as shown in U.S. Pat. No. 6,897,281. Additional types of water-dispersible enhancing moieties can include thioglycolic acid, 2,6-dihydroxybenzoic acid, sulfoisophthalic acid, polyethylene glycol, and the like, and mixtures thereof. Additional details regarding water-dispersible enhancing moieties can be found in U.S. Pat. No. 7,476,705.

Polyamides

The polymer can comprise a polyamide, such as a thermoplastic polyamide, or a thermoset polyamide. The polyamide can be an elastomeric polyamide, including an elastomeric thermoplastic polyamide or an elastomeric thermoset polyamide. The polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. The polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

The polyamide can be a polyamide-containing block co-polymer. For example, the block co-polymer can have repeating hard segments, and repeating soft segments. The hard segments can comprise polyamide segments, and the soft segments can comprise non-polyamide segments. The polyamide-containing block co-polymer can be an elastomeric co-polyamide comprising or consisting of polyamide-containing block co-polymers having repeating hard segments and repeating soft segments. In block co-polymers, including block co-polymers having repeating hard segments and soft segments, physical crosslinks can be present within the segments or between the segments or both within and between the segments.

The polyamide itself, or the polyamide segment of the polyamide-containing block co-polymer can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide can be the same or different.

The polyamide or the polyamide segment of the polyamide-containing block co-polymer can be derived from the polycondensation of lactams and/or amino acids, and can include an amide segment having a structure shown in Formula 13, below, wherein R$_6$ group represents the portion of the polyamide derived from the lactam or amino acid.

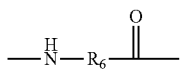
(Formula 13)

The $R_6$ group can be derived from a lactam. The $R_6$ group can be derived from a lactam group having from 3 to 20 carbon atoms, or a lactam group having from 4 to 15 carbon atoms, or a lactam group having from 6 to 12 carbon atoms. The $R_6$ group can be derived from caprolactam or laurolactam. The $R_6$ group can be derived from one or more amino acids. The $R_6$ group can be derived from an amino acid group having from 4 to 25 carbon atoms, or an amino acid group having from 5 to 20 carbon atoms, or an amino acid group having from 8 to 15 carbon atoms. The $R_6$ group can be derived from 12-aminolauric acid or 11-aminoundecanoic acid.

Optionally, in order to increase the relative degree of hydrophilicity of the polyamide-containing block co-polymer, Formula 13 can include a polyamide-polyether block copolymer segment, as shown below:

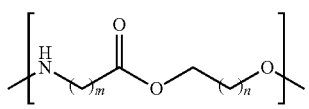
(Formula 14)

wherein m is 3-20, and n is 1-8. Optionally, m is 4-15, or 6-12 (e.g., 6, 7, 8, 9, 10, 11, or 12), and n is 1, 2, or 3. For example, m can be 11 or 12, and n can be 1 or 3. The polyamide or the polyamide segment of the polyamide-containing block co-polymer can be derived from the condensation of diamino compounds with dicarboxylic acids, or activated forms thereof, and can include an amide segment having a structure shown in Formula 15, below, wherein the $R_7$ group represents the portion of the polyamide derived from the diamino compound, and the $R_8$ group represents the portion derived from the dicarboxylic acid compound:

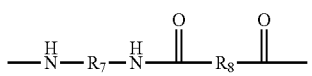
(Formula 15)

The $R_7$ group can be derived from a diamino compound that includes an aliphatic group having from 4 to 15 carbon atoms, or from 5 to 10 carbon atoms, or from 6 to 9 carbon atoms. The diamino compound can include an aromatic group, such as phenyl, naphthyl, xylyl, and tolyl. Suitable diamino compounds from which the $R_7$ group can be derived include, but are not limited to, hexamethylene diamine (HMD), tetramethylene diamine, trimethyl hexamethylene diamine (TMD), m-xylylene diamine (MXD), and 1,5-pentamine diamine. The $R_8$ group can be derived from a dicarboxylic acid or activated form thereof, including an aliphatic group having from 4 to 15 carbon atoms, or from 5 to 12 carbon atoms, or from 6 to 10 carbon atoms. The dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include adipic acid, sebacic acid, terephthalic acid, and isophthalic acid. The polyamide chain can be substantially free of aromatic groups.

Each polyamide segment of the polyamide (including the polyamide-containing block co-polymer) can be independently derived from a polyamide prepolymer selected from the group consisting of 12-aminolauric acid, caprolactam, hexamethylene diamine and adipic acid.

The polyamide can comprise or consist essentially of a poly(ether-block-amide). The poly(ether-block-amide) can be formed from the polycondensation of a carboxylic acid terminated polyamide prepolymer and a hydroxyl terminated polyether prepolymer to form a poly(ether-block-amide), as shown in Formula 16:

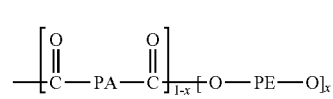
(Formula 16)

The poly(ether block amide) polymer can be prepared by polycondensation of polyamide blocks containing reactive ends with polyether blocks containing reactive ends. Examples include: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

The poly(ether block amide) polymers can include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. The copolymer can comprise polyamide blocks comprising polyamide 12 or of polyamide 6.

The poly(ether block amide) polymers can include those comprising polyamide blocks derived from the condensation of one or more α, ω-aminocarboxylic acids and/or of one or more lactams containing from 6 to 12 carbon atoms in the presence of a dicarboxylic acid containing from 4 to 12 carbon atoms, and are of low mass, i.e., they have a number-average molecular weight of from 400 to 1000. In poly(ether block amide) polymers of this type, an α, ω-aminocarboxylic acid such as aminoundecanoic acid or aminododecanoic acid can be used; a dicarboxylic acid such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98 weight percent and are preferably hydrogenated) and dodecanedioic acid HOOC—$(CH_2)_{10}$—COOH can be used; and a lactam such as caprolactam and lauryllactam can be used; or various combinations of any of the foregoing. The copolymer can comprise polyamide blocks obtained by condensation of lauryllactam in the presence of adipic acid or dodecanedioic acid and with a number average molecular weight of at least 750 have a melting temperature of from about 127 to about 130 degrees C. The various constituents of the polyamide block and their proportion can be chosen in order to obtain a melting point of less than 150 degrees C., or from about 90 degrees C. to about 135 degrees C.

The poly(ether block amide) polymers can include those comprising polyamide blocks derived from the condensation of at least one α, ω-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be acyclic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

The polyamide can be a thermoplastic polyamide and the constituents of the polyamide block and their proportion can be chosen in order to obtain a melting temperature of less than 150 degrees C., such as a melting point of from about 90 degrees C. to about 135 degrees C. The various constituents of the thermoplastic polyamide block and their proportion can be chosen in order to obtain a melting point of less than 150 degrees C., such as from about and 90 degrees C. to about 135 degrees C.

The number average molar mass of the polyamide blocks can be from about 300 grams per mole to about 15,000 grams per mole, from about 500 grams per mole to about 10,000 grams per mole, from about 500 grams per mole to about 6,000 grams per mole, from about 500 grams per mole to about 5,000 grams per mole, or from about 600 grams per mole to about 5,000 grams per mole. The number average molecular weight of the polyether block can range from about 100 to about 6,000, from about 400 to about 3000, or from about 200 to about 3,000. The polyether (PE) content (x) of the poly(ether block amide) polymer can be from about 0.05 to about 0.8 (i.e., from about 5 mole percent to about 80 mole percent). The polyether blocks can be present in the polyamide in an amount of from about 10 weight percent to about 50 weight percent, from about 20 weight percent to about 40 weight percent, or from about 30 weight percent to about 40 weight percent. The polyamide blocks can be present in the polyamide in an amount of from about 50 weight percent to about 90 weight percent, from about 60 weight percent to about 80 weight percent, or from about 70 weight percent to about 90 weight percent.

The polyether blocks can contain units other than ethylene oxide units, such as, for example, propylene oxide or polytetrahydrofuran (which leads to polytetramethylene glycol sequences). It is also possible to use simultaneously PEG blocks, i.e., those consisting of ethylene oxide units, polypropylene glycol (PPG) blocks, i.e. those consisting of propylene oxide units, and poly(tetramethylene ether)glycol (PTMG) blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 weight percent to about 50 weight percent of the copolymer, or from about 35 weight percent to about 50 weight percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place from about 180 to about 300 degrees C., such as from about 200 degrees to about 290 degrees C., and the pressure in the reactor can be set from about 5 to about 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. The polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 millibar (5000 Pascals) at a temperature such that the reactants and the copolymers obtained are in the molten state. By way of example, this temperature can be from about 100 to about 400 degrees C., such as from about 200 to about 250 degrees C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. The catalyst can be a derivative of a metal (M) chosen from the group formed by titanium, zirconium and hafnium. The derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

The catalyst can comprise a salt of the metal (M), particularly the salt of (M) and of an organic acid and the complex salts of the oxide of (M) and/or the hydroxide of (M) and an organic acid. The organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid or crotonic acid. The organic acid can be an acetic acid or a propionic acid. M can be zirconium and such salts are called zirconyl salts, e.g., the commercially available product sold under the name zirconyl acetate.

The weight proportion of catalyst can vary from about 0.01 to about 5 percent of the weight of the mixture of the dicarboxylic polyamide with the polyetherdiol and the polyol. The weight proportion of catalyst can vary from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of highly variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is from about 5 to about 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. It can be useful to blend a block copolymer having a high level of polyamide groups with a block copolymer having a higher level of polyether blocks, to produce a blend having an average level of polyether blocks of about 20 to about 40 weight percent of the total blend of poly(amid-block-ether) copolymers, or about 30 to about 35 weight percent. The copolymer can comprise a blend of two different poly(ether-block-amide)s comprising at least one block copolymer having a level of polyether blocks below 35 weight percent, and a second poly(ether-block-amide) having at least 45 weight percent of polyether blocks.

Exemplary commercially available copolymers include, but are not limited to, those available under the tradenames of "VESTAMID" (Evonik Industries, Essen, Germany); "PLATAMID" (Arkema, Colombes, France), e.g., product code H2694; "PEBAX" (Arkema), e.g., product code "PEBAX MH1657" and "PEBAX MV1074"; "PEBAX RNEW" (Arkema); "GRILAMID" (EMS-Chemie AG, Domat-Ems, Switzerland), or also to other similar materials produced by various other suppliers.

The polyamide can be physically crosslinked through, e.g., nonpolar or polar interactions between the polyamide groups of the polymers. In examples where the polyamide is a copolyamide, the copolyamide can be physically crosslinked through interactions between the polyamide groups, and optionally by interactions between the copolymer groups. When the co-polyamide is physically crosslinked through interactions between the polyamide groups, the polyamide segments can form the portion of the polymer referred to as the hard segment, and copolymer segments can form the portion of the polymer referred to as the soft segment. For example, when the copolyamide is a poly(ether-block-amide), the polyamide segments form the hard segments of the polymer, and polyether segments form the soft segments of the polymer. Therefore, in some examples, the polymer can include a physically crosslinked polymeric network having one or more polymer chains with amide linkages.

The polyamide segment of the co-polyamide can include polyamide-11 or polyamide-12 and the polyether segment can be a segment selected from the group consisting of polyethylene oxide, polypropylene oxide, and polytetramethylene oxide segments, and combinations thereof.

The polyamide can be partially or fully covalently crosslinked, as previously described herein. In some cases, the degree of crosslinking present in the polyamide is such that, when it is thermally processed, e.g., in the form of a yarn or fiber to form the articles of the present disclosure, the partially covalently crosslinked thermoplastic polyamide retains sufficient thermoplastic character that the partially covalently crosslinked thermoplastic polyamide is melted during the processing and re-solidifies. In other cases, the crosslinked polyamide is a thermoset polymer.

Polyesters

The polymers can comprise a polyester. The polyester can comprise a thermoplastic polyester, or a thermoset polyester. Additionally, the polyester can be an elastomeric polyester, including a thermoplastic polyester or a thermoset elastomeric polyester. The polyester can be formed by reaction of one or more carboxylic acids, or its ester-forming derivatives, with one or more bivalent or multivalent aliphatic, alicyclic, aromatic or araliphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

The polyester can be a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist essentially of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure which are relatively harder (hard segments), and repeating blocks of the same chemical structure which are relatively softer (soft segments). In block co-polyesters, including block co-polyesters having repeating hard segments and soft segments, physical crosslinks can be present within the blocks or between the blocks or both within and between the blocks. The polymer can comprise or consist essentially of an elastomeric co-polyester having repeating blocks of hard segments and repeating blocks of soft segments.

The non-polyester segments of the co-polyester can comprise or consist essentially of polyether segments, polyamide segments, or both polyether segments and polyamide segments. The co-polyester can be a block co-polyester, or can be a random co-polyester. The co-polyester can be formed from the polycondensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1,3-propanediol. Examples of co-polyesters include polyethylene adipate, polybutylene succinate, poly (3-hydroxybutyrate-co-3-hydroxyvalerate), polyethylene terephthalate, polybutylene terephthalate, polytrimethylene terephthalate, polyethylene napthalate, and combinations thereof. The co-polyamide can comprise or consist of polyethylene terephthalate.

The polyester can be a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

The polyester can be a biodegradable resin, for example, a copolymerized polyester in which poly($\alpha$-hydroxy acid) such as polyglycolic acid or polylactic acid is contained as principal repeating units.

The disclosed polyesters can be prepared by a variety of polycondensation methods known to the skilled artisan, such as a solvent polymerization or a melt polymerization process.

Polyolefins

The polymers can comprise or consist essentially of a polyolefin. The polyolefin can be a thermoplastic polyolefin or a thermoset polyolefin. Additionally, the polyolefin can be an elastomeric polyolefin, including a thermoplastic elastomeric polyolefin or a thermoset elastomeric polyolefin. Exemplary polyolefins can include polyethylene, polypropylene, and olefin elastomers (e.g., metallocene-catalyzed block copolymers of ethylene and $\alpha$-olefins having 4 to about 8 carbon atoms). The polyolefin can be a polymer comprising a polyethylene, an ethylene-$\alpha$-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary polyolefins include polymers of cycloolefins such as cyclopentene or norbornene.

It is to be understood that polyethylene, which optionally can be crosslinked, is inclusive a variety of polyethylenes, including low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

The polyolefin can be formed through free radical, cationic, and/or anionic polymerization by methods well known to those skilled in the art (e.g., using a peroxide initiator, heat, and/or light). The disclosed polyolefin can be prepared by radical polymerization under high pressure and at elevated temperature. Alternatively, the polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. The metal complexes can be in the free form or fixed on substrates, typically on activated magnesium chloride, titanium(III) chloride, alumina or silicon oxide. The metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable polyolefins can be prepared by polymerization of monomers of monolefins and diolefins as described herein. Exemplary monomers that can be used to prepare the polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-$\alpha$-olefin copolymers can be obtained by copolymerization of ethylene with an $\alpha$-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbury mixer and a biaxial extruder.

The polyolefin can be a mixture of polyolefins, such as a mixture of two or more polyolefins disclosed herein above. For example, a suitable mixture of polyolefins can be a mixture of polypropylene with polyisobutylene, polypropylene with polyethylene (for example PP/HDPE, PP/LDPE) or mixtures of different types of polyethylene (for example LDPE/HDPE).

The polyolefin can be a copolymer of suitable monolefin monomers or a copolymer of a suitable monolefin monomer and a vinyl monomer. Exemplary polyolefin copolymers include ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

The thermoplastic and/or thermosetting material can further comprise one or more processing aids. The processing aid can be a non-polymeric material. These processing aids can be independently selected from the group including, but not limited to, curing agents, initiators, plasticizers, mold release agents, lubricants, antioxidants, flame retardants, dyes, pigments, reinforcing and non-reinforcing fillers, fiber reinforcements, and light stabilizers.

The polymeric component of the cured coating, coating composition, or the fiber, which includes of all polymers present in the cured coating, cured composition, or in the fiber, can consist essentially of one or more polyurethane homopolymers, one or more polyurethane copolymers, or any combination thereof. The polymeric component can consist essentially of one or more polyether homopolymers, one or more polyether copolymers, or any combination thereof. The polymeric component can consist essentially of one or more polyester homopolymers, one or more polyester copolymers, or any combination thereof. The polymeric component can consist essentially of one or more polyisoprene homopolymers or copolymers, one or more polybutadiene homopolymers or copolymers, or any combination thereof. The polymeric component can consist essentially of one or more vinyl acetate homopolymers or copolymers, one or more styrene homopolymers or copolymers, or any combination thereof. The polymeric component can consist essentially of one or more olefinic homopolymers or copolymers. In an aspect, the polymeric component of the polymeric material on the surface of the article can consist essentially of one or more olefinic homopolymers.

In regard to "consists essentially of", the polymeric material does not include substantial amounts (e.g., greater than about 1 weight percent) of types of polymer besides those listed, but the material may include non-polymeric ingredients such as fillers, pigments, UV absorbers, and the like.

The terms "filament," "fiber," or "fibers" as used herein refer to materials that are in the form of discrete elongated pieces that are significantly longer than they are wide. The coating as described herein can be disposed onto a fiber to form the coated fiber. A "textile" may be defined as any material manufactured from fibers, filaments, or yarns characterized by flexibility, fineness, and a high ratio of length to thickness. Textiles generally fall into two categories. The first category includes textiles produced directly from webs of filaments or fibers by randomly interlocking to construct non-woven fabrics and felts. The second category includes textiles formed through a mechanical manipulation of yarn, thereby producing a woven fabric, a knitted fabric, a braided fabric, a crocheted fabric, and the like. A textile of the present disclosure can include at least one coated fiber.

The fiber can include natural, man-made or synthetic fibers. The fibers may be produced by conventional techniques, such as extrusion, electrospinning, interfacial polymerization, pulling, and the like. The fibers can include carbon fibers, boron fibers, silicon carbide fibers, titania fibers, alumina fibers, quartz fibers, glass fibers, such as E, A, C, ECR, R, S, D, and NE glasses and quartz, or the like. The fibers can be fibers formed from synthetic polymers capable of forming fibers such as poly(ether ketone), polyimide, polybenzoxazole, poly(phenylene sulfide), polyesters, polyolefins (e.g., polyethylene, polypropylene), aromatic polyamides (e.g., an aramid polymer such as para-aramid fibers and meta-aramid fibers), aromatic polyimides, polybenzimidazoles, polyetherimides, polytetrafluoroethylene, acrylic, modacrylic, poly(vinyl alcohol), polyamides, polyurethanes, and copolymers such as polyether-polyurea copolymers, polyester-polyurethanes, polyether block amide copolymers, or the like. The fibers can be natural fibers (e.g., silk, wool, cashmere, vicuna, cotton, flax, hemp, jute, sisal). The fibers can be man-made fibers from regenerated natural polymers, such as rayon, lyocell, acetate, triacetate, rubber, and poly(lactic acid).

The fibers can have an indefinite length. For example, man-made and synthetic fibers are generally extruded in substantially continuous strands. Alternatively, the fibers can be staple fibers, such as, for example, cotton fibers or extruded synthetic polymer fibers can be cut to form staple fibers of relatively uniform length. The staple fiber can have a have a length of about 1 millimeter to 100 centimeters or more as well as any increment therein (e.g., 1 millimeter increments).

The fiber can have any of a variety of cross-sectional shapes. Natural fibers can have a natural cross-section, or can have a modified cross-sectional shape (e.g., with processes such as mercerization). Man-made or synthetic fibers can be extruded to provide a strand having a predetermined cross-sectional shape. The cross-sectional shape of a fiber can affect its properties, such as its softness, luster, and wicking ability. The fibers can have round or essentially round cross sections. Alternatively, the fibers can have non-round cross sections, such as flat, oval, octagonal, rectangular, wedge-shaped, triangular, dog-bone, multi-lobal, multi-channel, hollow, core-shell, or other shapes.

The fiber can be processed. For example, the properties of fibers can be affected, at least in part, by processes such as drawing (stretching) the fibers, annealing (hardening) the fibers, and/or crimping or texturizing the fibers.

In some cases a fiber can be a multi-component fiber, such as one comprising two or more co-extruded polymeric materials. The two or more co-extruded polymeric materials can be extruded in a core-sheath, islands-in-the-sea, segmented-pie, striped, or side-by-side configuration. A multi-component fiber can be processed in order to form a plurality of smaller fibers (e.g., microfibers) from a single fiber, for example, by remove a sacrificial material.

The fiber can be a carbon fiber such as TARIFYL produced by Formosa Plastics Corp. of Kaohsiung City, Taiwan, (e.g., 12,000, 24,000, and 48,000 fiber tows, specifically fiber types TC-35 and TC-35R), carbon fiber produced by SGL Group of Wiesbaden, Germany (e.g., 50,000 fiber tow), carbon fiber produced by Hyosung of Seoul, South Korea, carbon fiber produced by Toho Tenax of Tokyo, Japan, fiberglass produced by Jushi Group Co., LTD of Zhejiang, China (e.g., E6, 318, silane-based sizing, filament diameters 14, 15, 17, 21, and 24 micrometers), and polyester fibers produced by Amann Group of Bonningheim, Germany (e.g., SERAFILE 200/2 non-lubricated polyester filament and SERAFILE COMPHIL 200/2 lubricated polyester filament).

A plurality of fibers includes 2 to hundreds or thousands or more fibers, where at least one of the fibers is coated while a majority or all of the fibers can be coated fibers. The plurality of fibers can be in the form of bundles of strands of fibers, referred to as tows, or in the form of relatively aligned staple fibers referred to as sliver and roving. A single type fiber can be used either alone or in combination with one or more different types of fibers by co-mingling two or more types of fibers. Examples of co-mingled fibers include polyester fibers with cotton fibers, glass fibers with carbon fibers, carbon fibers with aromatic polyimide (aramid) fibers, and aromatic polyimide fibers with glass fibers.

As used herein, the term "yarn" refers to an assembly formed of one or more fibers (e.g., where at least one is a coated fiber), wherein the strand has a substantial length and a relatively small cross-section, and is suitable for use in the production of textiles by hand or by machine, including textiles made using weaving, knitting, crocheting, braiding, sewing, embroidery, or ropemaking techniques. Thread is a type of yarn commonly used for sewing.

As described herein, the at least one coated fiber can be included in a yarn. A yarn is a long continuous length of one or more fibers suitable for use in the production of textiles by hand or by machine, including textiles made using weaving, knitting, crocheting, braiding, sewing, embroidery, or ropemaking techniques. Thread is a type of yarn commonly used for sewing.

Yarns can be made using fibers formed of natural, man-made and synthetic materials. Synthetic fibers are most commonly used to make spun yarns from staple fibers, and filament yarns. Spun yarn is made by arranging and twisting staple fibers together to make a cohesive strand. The process of forming a yarn from staple fibers typically includes carding and drawing the fibers to form sliver, drawing out and twisting the sliver to form roving, and spinning the roving to form a strand. Multiple strands can be plied (twisted together) to make a thicker yarn. The twist direction of the staple fibers and of the plies can affect the final properties of the yarn. A filament yarn can be formed of a single long, substantially continuous filament, which is conventionally referred to as a "monofilament yarn," or a plurality of individual filaments grouped together. A filament yarn can also be formed of two or more long, substantially continuous filaments which are grouped together by grouping the filaments together by twisting them or entangling them or both. As with staple yarns, multiple strands can be plied together to form a thicker yarn.

Once formed, the yarn can undergo further treatment such as texturizing, thermal or mechanical treating, or coating with a material such as a synthetic polymer. The fibers, yarns, or textiles, or any combination thereof, used in the disclosed articles can be sized. Sized fibers, yarns, and/or textiles are coated on at least part of their surface with a sizing composition selected to change the absorption or wear characteristics, or for compatibility with other materials. The sizing composition facilitates wet-out and wet-through of the coating or resin upon the surface and assists in attaining desired physical properties in the final article. An exemplary sizing composition can comprise, for example, epoxy polymers, urethane-modified epoxy polymers, polyester polymers, phenol polymers, polyamide polymers, polyurethane polymers, polycarbonate polymers, polyetherimide polymers, polyamideimide polymers, polystylylpyridine polymers, polyimide polymers bismaleimide polymers, polysulfone polymers, polyethersulfone polymers, epoxy-modified urethane polymers, polyvinyl alcohol polymers, polyvinyl pyrrolidone polymers, and mixtures thereof.

Two or more yarns can be combined, for example, to form composite yarns such as single- or double-covered yarns, and corespun yarns. Accordingly, yarns may have a variety of configurations that generally conform to the descriptions provided herein.

The yarn can comprise at least one thermoplastic material (e.g., one or more of the fibers can be made of thermoplastic material). The yarn can be made of a thermoplastic material. The yarn can be coated with a layer of a material such as a thermoplastic material.

The linear mass density or weight per unit length of a yarn can be expressed using various units, including denier (D) and tex. Denier is the mass in grams of 9000 meters of yarn. The linear mass density of a single filament of a fiber can also be expressed using denier per filament (DPF). Tex is the mass in grams of a 1000 meters of yarn. Decitex is another measure of linear mass, and is the mass in grams for a 10,000 meters of yarn.

As used herein, tenacity is understood to refer to the amount of force (expressed in units of weight, for example: pounds, grams, centinewtons or other units) needed to break a yarn (i.e., the breaking force or breaking point of the yarn), divided by the linear mass density of the yarn expressed, for example, in (unstrained) denier, decitex, or some other measure of weight per unit length. The breaking force of the yarn is determined by subjecting a sample of the yarn to a known amount of force, for example, using a strain gauge load cell such as an INSTRON brand testing system (Norwood, MA, USA). Yarn tenacity and yarn breaking force are distinct from burst strength or bursting strength of a textile, which is a measure of how much pressure can be applied to the surface of a textile before the surface bursts.

Generally, in order for a yarn to withstand the forces applied in an industrial knitting machine, the minimum tenacity required is approximately 1.5 grams per Denier. Most yarns formed from commodity polymeric materials generally have tenacities in the range of about 1.5 grams per Denier to about 4 grams per Denier. For example, polyester yarns commonly used in the manufacture of knit uppers for footwear have tenacities in the range of about 2.5 to about 4 grams per Denier. Yarns formed from commodity polymeric materials which are considered to have high tenacities generally have tenacities in the range of about 5 grams per Denier to about 10 grams per Denier. For example, commercially available package dyed polyethylene terephthalate yarn from National Spinning (Washington, NC, USA) has a tenacity of about 6 grams per Denier, and commercially available solution dyed polyethylene terephthalate yarn from Far Eastern New Century (Taipei, Taiwan) has a tenacity of about 7 grams per Denier. Yarns formed from high performance polymeric materials generally have tenacities of about 11 grams per Denier or greater. For example, yarns formed of aramid fiber typically have tenacities of about 20 grams per Denier, and yarns formed of ultra-high molecular weight polyethylene (UHMWPE) having tenacities greater than 30 grams per Denier are available from Dyneema (Stanley, NC, USA) and Spectra (Honeywell-Spectra, Colonial Heights, VA, USA).

Various techniques exist for mechanically manipulating yarns to form a textile. Such techniques include, for example, interweaving, intertwining and twisting, and interlooping. Interweaving is the intersection of two yarns that cross and interweave at right angles to each other. The yarns utilized in interweaving are conventionally referred to as "warp" and "weft." A woven textile includes include a warp yarn and a weft yarn. The warp yarn extends in a first direction, and the weft strand extends in a second direction that is substantially perpendicular to the first direction. Intertwining and twisting encompasses various procedures, such as braiding and knotting, where yarns intertwine with each other to form a textile. Interlooping involves the formation of a plurality of columns of intermeshed loops, with knitting being the most common method of interlooping. The textile may be primarily formed from one or more yarns that are mechanically-manipulated, for example, through interweaving, intertwining and twisting, and/or interlooping processes, as mentioned above.

The textile can be a nonwoven textile. Generally, a nonwoven textile or fabric is a sheet or web structure made from fibers and/or yarns that are bonded together. The bond can be a chemical and/or mechanical bond, and can be formed using heat, solvent, adhesive or a combination thereof. Exemplary nonwoven fabrics are flat or tufted porous sheets that are made directly from separate fibers, molten plastic and/or plastic film. They are not made by weaving or knitting and do not necessarily require converting the fibers to yarn, although yarns can be used as a source of the fibers. Nonwoven textiles are typically manufactured by putting small fibers together in the form of a sheet or web (similar to paper on a paper machine), and then binding them either mechanically (as in the case of felt, by interlocking them with serrated or barbed needles, or hydro-entanglement such that the inter-fiber friction results in a stronger fabric), with an adhesive, or thermally (by applying binder (in the form of powder, paste, or polymer melt) and melting the binder onto the web by increasing temperature). A nonwoven textile can be made from staple fibers (e.g., from wetlaid, airlaid, carding/crosslapping processes), or extruded fibers (e.g., from meltblown or spunbond processes, or a combination thereof), or a combination thereof. Bonding of the fibers in the nonwoven textile can be achieved with thermal bonding (with or without calendering), hydro-entanglement, ultrasonic bonding, needlepunching (needlefelting), chemical bonding (e.g., using binders such as latex emulsions or solution polymers or binder fibers or powders), meltblown bonding (e.g., fiber is bonded as air attenuated fibers intertangle during simultaneous fiber and web formation).

in regard to the resin material, the resin material is used to consolidate the coated fiber(s) by wetting fiber(s) with the resin material. After the fiber(s) are wetted with the resin material, the resin material is solidified (e.g., cured). The wetting process can be performed under vacuum and/or under increased temperature in order to remove any air trapped between the fibers or within the resin material, or to reduce the viscosity of the resin material that the resin material flows around and encapsulates the fiber(s). The resin material is a liquid when it is disposed onto the fiber(s), and is then solidified (e.g., cured, including polymerized and/or crosslinked) to form a sold resin material in the final article.

The resin material can be a thermoplastic resin material comprising one or more thermoplastic polymers as described above. The thermoplastic resin material can be applied to the coated fiber(s) when molten, and then cooled to solidify the thermoplastic resin material in the final article.

The resin material can be a reactive resin material comprising one or more monomers, oligomers, or uncrosslinked polymers as described above. The reactive resin material can be applied to the coated fiber(s) when liquid, and can then be cured to solidify the reactive resin material in the final article. For example, curing can comprise exposing the liquid resin material to actinic radiation (e.g., thermal energy, ultra violet (UV) radiation, etc.) in order to initiate a polymerization and/or crosslinking reaction which solidifies the reactive resin material. Alternatively or additionally, the components of the reactive resin material can include ingredients which react on contact with each other, and the reactive resin material can be compounded shortly before application to the coated fiber(s), before the reactive resin material has fully reacted and solidified.

The resin material can be a single component or multi-component polymeric system, such as, for example, an epoxy system. The resin material can be UV cured or thermally cured at temperatures below 100° C. The resin material can be a two component system such as CR-157/DD3 (Applied Poleramic (API). Cal., USA). In general, the resin material can include a polymer and a curing agent or catalyst, where the components are stored separately and are mixed to form the resin material. In an aspect, the resin material can be a monofunctional epoxy such as $C_{1\ to\ 20}$ aliphatic epoxy resins, $C_{3\ to\ 20}$ cycloaliphatic epoxy resin, and $C_{6\ to\ 20}$ aromatic monofunctional epoxy resins. In addition, other resin materials can be used where the resin material is pre-reacted with the curing agent and can include difunctional polymeric resins, trifunctional polymeric resins, tetrafunctional polymeric resins, and higher functional polymeric resins. These types of polymeric resins can include diglycidyl ethers of bisphenol A, diglycidyl ethers of bisphenol F, diglycidyl ether of bisphenol S, diglycidyl-p-aminophenol, triglycidyl aminocresol, triglycidyl-p-aminophenol, tetraglycidyl ethers of methylenedianiline, phenol novolac type epoxy resins, cresol novolac type epoxy resins, resorcinol type epoxy resins, epoxy resins with a naphthalene skeleton, biphenyl type epoxy resins, dicyclopentadiene type epoxy resins and diphenylfluorene type epoxy resins, and the like. Each of these resins can be used individually or in any appropriate combination. Additional details are provided in U.S. Pat. No. 7,008,555.

Curing agents for multicomponent polymeric resins are compounds that have a reactive moiety that can react with a functional group (e.g., the epoxy group of an epoxy resin). In some instances heat may be required for significant reaction to occur. In an aspect, curing agents for polymeric resins include: aromatic amines, cyclic amines, aliphatic amines, alkyl amines, various acid anhydrides, carboxylic anhydrides, carboxylic acid amides, carboxylic acid hydrazides, polyamides (e.g., Nylon 6 or 66), polyphenols, cresol and phenol novolac resins, isomers of dicyandiamide, substituted ureas, imidazoles, tertiary amines, Lewis acid complexes such as boron trifluoride and boron trichloride, polymercaptans, or any epoxy-modified amine products thereof, Mannich modified products thereof, Michael modified addition products thereof, and combinations thereof. The ratio of curing agent to polymeric resin can be about 1:99 to 50:50.

The aromatic amine can be selected from: 1,8 diaminoaphthalene, m-phenylenediamine, diethylene toluene diamine, diaminodiphenylsulfone, diaminodiphenylmethane, diaminodiethyldimethyl diphenylmethane, 4,4'-methylenebis(2,6-diethylaniline), 4,4'-methylenebis(2-isopropyl-6-methylaniline), 4,4'-methylenebis(2,6-diisopropylaniline), 4,4'-[1,4-phenylenebis(1-methyl-ethylindene)]bisaniline, 4,4'-[1,3-phenylenebis(1-methyl-ethylindene)]bisaniline, 1,3-bis(3-aminophenoxy)benzene, bis-[4-(3-aminophenoxy)phenyl]sulfone, bis-[4-(4-aminophenoxy)phenyl]sulfone, 2,2'-bis[4-(4-aminophenoxy)phenyl]propane. Furthermore, the aromatic amines can include heterocyclic multifunctional amines as disclosed in U.S. Pat. Nos. 4,427,802, 4,599,413, and 7,008,555.

The cyclic amines can include: bis(4-amino-3-methyldicyclohexyl)methane, diaminodicyclohexylmethane, bis(aminomethyl)cyclohexane, N-aminoethylpyrazine, 3,9-bis(3-aminopropyl)-2,4,8,10-tetraoxaspiro(5,5)undecane, m-xylenediamine, isophoronediamine, menthenediamine, 1,4-bis(2-amino-2-methylpropyl) piperazine, N,N'-dimethylpiperazine, pyridine, picoline, 1,8-diazabicyclo[5,4,0]-7-undecene, benzylmethylamine, 2-(dimethylaminomethyl)-phenol, 2-methylimidazole, 2-phenylimidazole, and 2-ethyl-4-methylimidazole.

The linear aliphatic amine can include: diethylenetriamine, triethylenetetramine, tetraethylenepentamine, 3-(dimethylamino)propylamine, 3-(diethylamino)-propylamine, 3-(methylamino)propylamine, tris(2-aminoethyl)amine; 3-(2-ethylhexyloxy)propylamine, 3-ethoxypropylamine, 3-methoxypropylamine, 3-(dibutylamino)propylamine, and tetramethyl-ethylenediamine; ethylenediamine; 3,3'-iminobis(propylamine), N-methyl-3,3'-iminobis(propylamine); allylamine, diallylamine, triallylamine, polyoxypropylenediamine, and polyoxypropylenetriamine.

The alkylamine can include: methylamine, ethylamine, propylamine, isopropylamine, butylamine, sec-butylamine, t-butylamine, n-octylamine, and 2-ethylhexylamine; dimethylamine, diethylamine, dipropylamine, diisopropylamine, dibutylamine, di-sec-butylamine, di-t-butylamine, di-n-octylamine, and di-2-ethylhexylamine; trimethylamine, tripropylamine, triisopropylamine, tributylamine, tri-sec-butylamine, tri-t-butylamine, and tri-n-octylamine.

Salts of amine compounds can be used and these include: thiocyanate, borate, hydrochloride, phosphate, and sulfate salt. For example, the thiocyanate salt can be: diethylenetriamine thiocyanate, 2,4,6-tris(dimethylaminomethyl)phenol thiocyanate, 1,8-diazabicyclo[5.4.0]-7-undecene thiocyanate, m-xylenediamine thiocyanate, and isophoronediamine thiocyanate.

The aliphatic aromatic amine can be α-(m/p-aminophenyl) ethylamine and the like.

The anhydride can include: phthalic anhydride, hexahydrophthalic anhydride, nadic methyl anhydride, dodecenylsuccinic anhydride, tetrahydrophthalic anhydride, maleic anhydride, pyromellitic dianhydride, trimellitic anhydride, benzophenonetetracarboxylic dianhydride, and a derivative or adduct thereof.

One or more additional types of fibers can be intermixed (e.g., co-mingled) with the coated fiber(s). One or more of the additional types of fibers can comprise the resin material as described herein. In this regard, the plurality of fibers including the additional type of fiber including the resin material can be heated (e.g., to or above the melting point of the additional type of fiber) so that the fiber melts and the resin material consolidates the coated fibers.

A first stitching thread can be used to attach the coated fiber(s) via one or more stitches (e.g., a first stich or stiches) to an article (e.g., a substrate, such as a textile, or a component of footwear). Optionally, the first stitching thread can comprise the resin material as described herein. In this regard, the first stitching thread can be heated (e.g., to the melting point of the first stitching thread) so that the first stitching thread melts and the resin material consolidates the coated fiber(s). Alternatively, the first stitching thread can be formed of a polymeric material which does not dissolve or melt during the process of forming the composite article (e.g., when exposed to the liquid resin material), and thus remains intact in the composite article.

The first stitches of the stitching tread can be to a substrate(s), where the substrate comprises the resin material as described herein (the first stitching thread can optionally comprise the resin material). The substrate can be positioned adjacent the coated fiber(s) (e.g., on top of, below, and/or otherwise dispersed among the coated fiber(s)). In this regard, the coated fiber(s) adjacent the substrate(s) can be heated (e.g., to or above the melting point of the substrate) so that the substrate(s) melts and the resin material consolidates the coated fiber(s). Alternatively, the substrate(s) can be formed of a polymeric material which does not dissolve or melt during the process of forming the composite article (e.g., when exposed to the liquid resin material), and thus remains intact in the composite article.

Any combination of the additional fibers, stitching thread, and the substrate that comprise the resin material can be used to provide all or a portion of the resin material consolidating the coated fiber(s). Alternatively, all of the resin material consolidating the coated fiber(s) can be provided separately from any additional fibers, stitching thread, and substrate present in the composite article.

As described herein, the resin material can be a liquid resin material that can be disposed (e.g., poured) onto the plurality of coated fibers. In addition to or instead of, additional fibers, a first stitching thread, and/or a substrate can be used to provide the resin material, where these materials can be melted to consolidate the plurality of fibers using the resin material.

Once formed, the composite article can be integrated into an article, including a component of a finished article, or a finished article. The finished article can be an article of footwear, where a composite article can be attached to an upper of. The composite article can be part of a sole structure (e.g., a plate including one or more traction elements) and the sole structure can be attached to the upper to form the article of footwear.

The polymeric materials of the present disclosure including the cured coating and coating composition (e.g., monomers and/or polymers of the matrix of crosslinked polymers), fibers, yarns, and the like or other compositions used to form the coating composition and the cured coating, coated fiber(s), uncoated fiber(s), additional fibers, resin materials, stitching threads, substrates, other textiles, etc., can optionally include additives, fillers, lubricants, antioxidants, ultraviolet absorbers, antistatic agents, flame retardants, fungicides, antibacterial agents, combinations thereof, or the like. In addition, these polymeric materials can optionally include monomers, oligomers, thermal initiators, photoinitiators, and catalysts.

The additives can include, but are not limited to, processing agents, anti-oxidants, ultraviolet stabilizers, optical brighteners, extenders, solid and liquid colorants, fillers, coupling agents, plasticizers, rheology modifiers, stabilizers, delusterants, antimicrobial agents, antistatic agents, and other functional additives, and combinations of additives.

The fillers can be utilized to increase strength of the material, abrasion resistance, modify thermal properties, reduce cost, and alter viscosity, thixotropy or overall fluid flow properties of the elastomer composition. The amount of filler (in terms of parts per hundred of resin ("phr" or parts by weight based on 100 parts of the polymeric component of the polymeric material), for example) can be varied to achieve the desired effective property such as strength, viscosity, and the like.

The filler can include, but is not limited to, clay, talc, asbestos, graphite, glass, mica (such as phologopite, biotie, zinnwaldite, muscovite, paragonite, celadonite and glauconite, clinochlore, chamosite, nimite, pennantite, sudoite, donbasite, clintonite, margarite, thulite, antigorite, lizardite, chrysotile, mesite, cronstedite, berthierine, greenalite, garnierite, and the like), calcium metasilicate, alumina, zinc sulfide, aluminum hydroxide, silica (such as amorphous silica, amorphous synthesized silica, and colloidal silica), silicates (such as actinolite, tourmaline, serpentine, aluminosilicates, and the like), silicon carbide, diatomaceous earth, carbonates (such as barium carbonate, calcium carbonate, magnesium carbonate and the like), kaolin (such as delaminated kaolin, calcined kaolin, and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), suitable organic fillers include, but are not limited to, carbon black, fullerene and/or carbon nanotubes, melamine colophony, cellulose fibers, carbon fibers or mixtures thereof, particulate synthetic plastics (such as high molecular weight polyethylene, polypropylene, polystyrene, polyethylene ionomeric resins, polyamide, polyester, polyurethane, polyimide, and the like), particulate carbonaceous materials (such as carbon black and the like), sulfates (such as calcium sulfate, magnesium sulfate, barium sulfate, and the like) as well as cotton flock, cellulose flock, cellulose pulp, leather fiber, and combinations of any of the above. In certain aspects, the disclosed fillers can be spherical, needle-like, plate type forms and the like, or irregular forms. In certain aspects, the filler can be a high aspect ratio fillers. Such fillers can be organic or inorganic. In a further aspect, the high aspect fillers can be inorganic microfibers such as whiskers (highly crystalline small single crystal fibers) or somewhat less perfect crystalline fibers such as boron fibers, potassium titanate, calcium sulfate, asbestos and calcium metasilicate. Typical levels of these and other fillers include from about 10 phr to 100 phr or higher (where "phr" indicates parts by weight based on 100 parts of the polymeric component). In various aspects, the composition can contain about 10-80, 30-70, 40-60, or 50-60 phr filler. In various aspects, the elastomer compositions comprise a silica filler. Typical levels of silica filler include from about 10 phr to 100 phr or higher. In various aspects, the compositions contain about 10-80, 30-70, 10-60, 40-60, 50-60, or 35-60 phr filler.

The additive can be a softener (also referred to herein as a softening agent). Examples of suitable softeners include, but are not limited to, oxyethylation products of higher fatty acids, fatty alcohols, or fatty acid amides, N-stearyl-urea compounds and stearylamidomethylpyridinium.

The additive can be a leveling agent. Examples of leveling agents include, but are not limited to, water-soluble salts of acidic esters obtained from polybasic acids and ethylene oxide or propylene oxide adducts of relatively long-chain base molecules capable of undergoing oxyalkylation.

The coating composition disposed on the coated fiber(s) can be effective in reducing a level of UV reaching the polymeric material forming the fiber(s) as compared to a substantially identical fiber without the cured coating. For example, the cured coating can be effective in blocking at least some UV light (e.g., at least 5 percent, or at least 10 percent, or 20 percent or more) from reaching the polymeric material underneath, thereby protecting the polymeric material and reducing yellowing of the polymeric material. This can be advantageous for polymeric material comprising polyamide homopolymers and copolymers, which are more prone to UV degradation and yellowing than other polymers.

The coating composition disposed on the coated fiber(s) can reduce a level of water reaching the first polymeric material forming the fiber(s) as compared to a substantially identical fiber without the cured coating. For example the cured coating can be effective in blocking at least some water (e.g., at least 5 percent, or at least 10 percent, or 20 percent or more) from reaching the polymeric material underneath, thereby reducing the amount of water that can be taken up by the polymeric material. This is advantageous for materials that are relatively hydrophilic (e.g., natural fibers, polyamide fibers and foams) and wick up enough water to noticeably increase the weight of the article.

Now having described various aspects of the coated fiber(s), additional details regarding making the coating composition, cured coating, coated fiber(s), composite article, etc. are provided. The method of making the one or more coated fiber(s) includes disposing a coating composition onto one or more fiber(s) (or to one or more fiber(s) present in the form of a tow, a yarn, a cable, or a textile), and curing the coating composition on the one or more fiber(s), forming a cured coating including a matrix of crosslinked polymers. The disposing can include spraying (e.g., using a spray gun), brushing, or dipping the coating composition onto a surface of the fiber. The fiber(s) can include a first polymeric material, and the disposing can comprise contacting the first polymeric material of the fiber with the coating composition. The coating composition comprises uncrosslinked polymers (e.g., a dispersion of polymers in a carrier). The uncrosslinked polymers can include uncrosslinked polyurethanes The curing can include heating the coating composition to about 50 degrees to 90 degrees C. or about 60 degrees to 80 degrees C. for about 1 or about 5 minutes or more.

The method can include applying a dye to the fiber(s) prior to or following the disposing and curing the coating composition. The method can include printing on the fiber(s) using an ink or a polymeric material (e.g., three dimensional printing) prior to or following the disposing and curing the coating composition. The method can include treating the fiber(s) prior to applying the coating composition in order to improve bonding of the cured coating to the fiber(s). For example, the treating can include applying a primer or tie layer to the fiber(s), washing the fiber(s) to remove dirt or spin finish, applying an oxidizing treatment such as a plasma or corona treatment, etc.

The one or more fiber(s) can be thermally treated prior to or following disposing and curing the coating composition. For example, the fiber(s) can be heated and at least partially or fully fused to each other or to other fibers prior to or following disposing and curing the coating composition. The fiber(s) can be thermally molded prior to or following application of the coating. The plurality of fibers can be thermally processed to the point that each fiber loses its fiber configuration to form a molded resin material, while the at least one fiber retains its fiber configuration within the molded resin material, where the at least one fiber is coated prior to or following formation of the molded resin material. Partially or fully fusing fibers alters the conformation of the fibers. When the one or more fiber(s) are partially or fully fused prior to disposing and curing the coating composition, the one or more fiber(s) may form a skin or film-like structure, and the coating composition may be disposed onto and cured on the skin or film-like structure. Alternatively, the coating composition can be disposed onto and cured on the one or more fiber(s), and one or more second fiber(s) adjacent the one or more coated fiber(s) can be partially or fully fused, forming a skin or film-like structure in which the one or more coated fiber(s) are at least partially embedded. Optionally or additionally, coating composition can be applied to the molded resin material including the one or more fiber(s).

The coated fiber(s) or a composite article including the coated fiber(s) can be disposed on or within a bladder. The coated fibers or a composite article can be disposed on an inside surface and/or an outside surface. The bladder is a bladder capable of including a volume of a fluid. An unfilled bladder is a fluid-fillable bladder and a filled bladder that has been at least partially inflated with a fluid at a pressure equal to or greater than atmospheric pressure. When disposed onto or incorporated into an article of footwear, apparel, or sports equipment, the bladder is generally, at that point, a fluid-filled bladder. The fluid can be a gas or a liquid. The gas can include air, nitrogen gas ($N_2$), or other appropriate gas.

The bladder can have a gas transmission rate for nitrogen gas, for example, where a bladder wall of a given thickness has a gas transmission rate for nitrogen that is at least about ten times lower than the gas transmission rate for nitrogen of a butyl rubber layer of substantially the same thickness as the thickness of the bladder described herein. The bladder can have a first bladder wall having a first bladder wall thickness (e.g., about 0.1 to 40 mils). The bladder can have a first bladder wall that can have a gas transmission rate (GTR) for nitrogen gas of less than about 15 $cm^3/m^2 \cdot atm \cdot day$, less than about 10 $m^3/m^2 \cdot atm \cdot day$, less than about 5 $cm^3/m^2 \cdot atm \cdot day$, less than about 1 $cm^3/m^2 \cdot atm \cdot day$ (e.g., from about 0.001 $cm^3/m^2 \cdot atm \cdot day$ to about 1 $cm^3/m^2 \cdot atm \cdot day$, about 0.01 $cm^3/m^2 \cdot atm \cdot day$ to about 1 $cm^3/m^2 \cdot atm \cdot day$ or about 0.1 $cm^3/m^2 \cdot atm \cdot day$ to about 1 $cm^3/m^2 \cdot atm \cdot day$) for an average wall thickness of 20 mils. The bladder can have a first bladder wall having a first bladder wall thickness, where the first bladder wall has a gas transmission rate of 15 $cm^3/m^2 \cdot atm \cdot day$ or less for nitrogen for an average wall thickness of 20 mils.

The bladder has a bladder wall having an interior-facing side and an exterior-facing side, where the interior-facing side defines at least a portion of an interior region of the bladder. The coated fibers and/or the composite structure can be disposed on the exterior-facing side of the bladder, the interior-facing side of the bladder, or both.

The bladder can include a top wall operably secured to the footwear upper, a bottom wall opposite the top wall, and one or more sidewalls extending between the top wall and the bottom wall of the inflated bladder. The top wall, the bottom wall, and the one or more sidewalls collectively define an interior region of the inflated bladder, and wherein the one or more sidewalls each comprise an exterior-facing side. The coated fibers and/or the composite structure can be disposed on the exterior-facing side of the bladder, the interior-facing side of the bladder, or both.

An accepted method for measuring the relative permeance, permeability, and diffusion of inflated bladders is ASTM D-1434-82-V. See, e.g., U.S. Pat. No. 6,127,026, which is incorporated by reference as if fully set forth herein. According to ASTM D-1434-82-V, permeance, permeability and diffusion are measured by the following formulae:

Permeance (quantity of gas)/[(area)×(time)×(pressure difference)]=permeance (*GTR*)/(pressure difference)= $cm^3/m^2 \cdot atm \cdot day$ (i.e., 24 hours)

Permeability

[(quantity of gas)×(film thickness)][(area)×(time)× (pressure difference)]=permeability [(*GTR*)× (film thickness)]/(pressure difference)=[($cm^3$) (mil)]/$m^2 \cdot atm \cdot day$ (i.e., 24 hours)

Diffusion at One Atmosphere (quantity of gas)/[(area)×(time)]=*GTR*=$cm^3/m^2 \cdot day$ (i.e., 24 hours)

The bladder can include a bladder wall that includes a film including at least one polymeric layer or at least two or more polymeric layers. Each of the polymeric layers can be about 0.1 to 40 mils in thickness. In an embodiment, the coated fibers and/or the composite structure can be disposed between one or more layers of the bladder wall.

The polymeric layer can be formed of polymer material such as a thermoplastic material as described above and herein. The thermoplastic material can include an elastomeric material, such as a thermoplastic elastomeric material. The thermoplastic materials can include thermoplastic polyurethane (TPU), such as those described above and herein. The thermoplastic materials can include polyester-based TPU, polyether-based TPU, polycaprolactone-based TPU, polycarbonate-based TPU, polysiloxane-based TPU, or combinations thereof. Non-limiting examples of thermoplastic material that can be used include: "PELLETHANE" 2355-85ATP and 2355-95AE (Dow Chemical Company of Midland, MI, USA), "ELASTOLLAN" (BASF Corporation, Wyandotte, MI, USA) and "ESTANE" (Lubrizol, Brecksville, OH, USA), all of which are either ester or ether based. Additional thermoplastic material can include those described in U.S. Pat. Nos. 5,713,141; 5,952,065; 6,082,025; 6,127,026; 6,013,340; 6,203,868; and 6,321,465, which are incorporated herein by reference.

The polymeric layer can be formed of one or more of the following: ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials as well as with the TPUs described herein and optionally including combinations of polyimides and crystalline polymers, are also suitable. For instance, blends of polyimides and liquid crystal polymers, blends of polyamides and polyethylene terephthalate, and blends of polyamides with styrenics are suitable.

Specific examples of polymeric materials of the polymeric layer can include acrylonitrile copolymers such as "BAREX" resins, available from Ineos (Rolle, Switzerland); polyurethane engineering plastics such as "ISPLAST" ETPU available from Lubrizol (Brecksville, OH, USA); ethylene-vinyl alcohol copolymers marketed under the tradenames "EVAL" by Kuraray (Houston, TX, USA), "SOARNOL" by Nippon Gohsei (Hull, England), and "SELAR OH" by DuPont (Wilmington, DE, USA); polyvinylidiene chloride available from S.C. Johnson (Racine, WI, USA) under the tradename "SARAN", and from Solvay (Brussels, Belgium) under the tradename "IXAN"; liquid crystal polymers such as "VECTRA" from Celanese (Irving, TX, USA) and "XYDAR" from Solvay; "MDX6" nylon, and amorphous nylons such as "NOVAMID" X21 from Koninklijke DSM N.V (Heerlen, Netherlands), "SELAR PA" from DuPont; polyetherimides sold under the tradename "ULTEM" by SABIC (Riyadh, Saudi Arabia); poly (vinyl alcohol)s; and polymethylpentene resins available from Mitsui Chemicals (Tokyo, Japan) under the tradename "TPX".

Each polymeric layer of the film can be formed of a thermoplastic material which can include a combination of thermoplastic polymers. In addition to one or more thermoplastic polymers, the thermoplastic material can optionally include a colorant, a filler, a processing aid, a free radical scavenger, an ultraviolet light absorber, and the like. Each polymeric layer of the film can be made of a different of thermoplastic material including a different type of thermoplastic polymer.

The bladder can be made by applying heat, pressure and/or vacuum to a film. The bladder (e.g., one or more polymeric layers) can be formed using one or more polymeric materials, and forming the bladder using one or more processing techniques including, for example, extrusion, blow molding, injection molding, vacuum molding, rotary molding, transfer molding, pressure forming, heat sealing, casting, low-pressure casting, spin casting, reaction injection molding, radio frequency (RF) welding, and the like. The bladder can be made by co-extrusion followed by heat sealing or welding to give an inflatable bladder, which can optionally include one or more valves (e.g., one way valves) that allows the bladder to be filled with the fluid (e.g., gas).

CLAUSES

Clause 1. An article comprising: one or more fiber(s); and a cured coating disposed on the one or more fiber(s), the cured coating including a matrix of crosslinked polymers.

Clause 2. The article of clause 1, wherein the cured coating is a product of crosslinking a coating composition comprising a dispersion of uncrosslinked polymers in a carrier to form the matrix of crosslinked polymers.

Clause 3. The article of any preceding clause, wherein the cured coating comprises a plurality of solid pigment particles entrapped in the matrix of crosslinked polymers, optionally wherein the solid pigment particles are selected from the group consisting of: metal and metal oxide pigments, carbon pigments, clay earth pigments, ultramarine pigments and a combination thereof.

Clause 4. The article of any preceding clause, wherein the cured coating further comprises a dye, optionally wherein the dye is an acid dye.

Clause 5. The article of any preceding clause, wherein the cured coating is elastomeric, optionally wherein the cured coating has an elongation of at least 100 percent or at least 200 percent.

Clause 6. The article of any preceding clause, wherein the matrix of crosslinked polymers include crosslinked polyurethane homopolymers or copolymers or both, and optionally includes crosslinked polyester polyurethanes.

Clause 7. The article of any preceding clause, wherein the cured coating is the product of crosslinking a coating composition comprising a dispersion of uncrosslinked polyurethane polymers in the carrier, and optionally wherein the uncrosslinked polyurethane polymers are elastomeric polyurethane polymers.

Clause 8. The article of any preceding clause, wherein the cured coating is the product of crosslinking a coating composition comprising a dispersion of uncrosslinked polyurethane polymers in the carrier, and optionally wherein the uncrosslinked polyurethane polymers are thermoplastic polyurethane polymers.

Clause 9. The article of any preceding clause, wherein the cured coating is the product of crosslinking the coating composition comprising the dispersion of uncrosslinked polymers in the carrier, and wherein the dispersion of uncrosslinked polymers is a water-borne dispersion of uncrosslinked polymers and the carrier is water or an aqueous solution.

Clause 10. The article of any preceding clause, wherein the cured coating is the product of crosslinking the coating composition comprising the dispersion of uncrosslinked polymers and a crosslinking agent in the carrier, optionally wherein the crosslinking agent is a water-borne crosslinking agent and the carrier is water or an aqueous solution.

Clause 11. The article of any preceding clause, wherein the cured coating is the product of crosslinking the coating composition comprising the dispersion of uncrosslinked polymers in the carrier and a plurality of pigment particles dispersed in the carrier; optionally wherein the pigment particles are selected from the group consisting of: metal and metal oxide pigments, carbon pigments, clay earth pigments, ultramarine pigments and a combination thereof.

Clause 12. The article of any preceding clause, wherein the cured coating is the product of crosslinking a coating composition comprising the dispersion of uncrosslinked polymers in the carrier and a dye dispersed or solubilized in the carrier; optionally wherein the dye is an acid dye.

Clause 13. The article of any preceding clause, wherein the cured coating is the product of crosslinking a coating composition comprising the dispersion of uncrosslinked polymers in the carrier, and an acid dye and a quaternary ammonium compound dispersed or solubilize din the carrier; optionally wherein the quaternary ammonium compound is a tetrabutyl ammonium compound; or optionally wherein the quaternary ammonium compound is a tetrabutyl ammonium halide.

Clause 14. The article of any preceding clause, wherein the cured coating is the product of crosslinking a coating composition comprising the dispersion of uncrosslinked polymers in the carrier, and an acid dye and a quaternary ammonium compound dispersed or solubilize din the carrier; optionally wherein the coating composition comprises from about 1 to about 15 weight percent of the quaternary ammonium compound, or wherein, in the coating composition, a molar ratio of the acid dye to the quaternary ammonium compound ranges from about 4:1 to about 1:4, or from about 1.5:1 to about 1:1.5.

Clause 15. The article of any preceding clause, wherein the cured coating is the product of crosslinking a coating composition comprising the dispersion of uncrosslinked polymers in a solution comprising an organic solvent, optionally wherein the solution is an aqueous solution and the organic solvent is a water-miscible organic solvent.

Clause 16. The article of any preceding clause, wherein the cured coating is disposed on the one or more fibers(s) partially or fully coats each of the one or more fiber(s).

Clause 17. The article of any preceding clause, wherein each of the one or more coated fiber is a natural fiber, or is a man-made fiber, or the one or more fiber(s) is a plurality of fibers including both natural fibers and man-made fibers.

Clause 18. The article of any preceding clause, wherein the one or more fiber(s) includes one or more man-made fiber (s), and the one or more man-made fibers(s) include thermoplastic polyurethane fibers, thermoplastic polyamide fibers, thermoplastic polyester fibers, thermoplastic polyether fibers, and any combination thereof.

Clause 19. The article of any preceding clause, wherein the one or more fiber(s) includes one or more man-made fiber (s), and the one or more man-made fibers(s) include glass fibers or carbon fibers or boron fibers or polymeric fibers or any combination thereof; optionally wherein the polymeric fibers are aramid fibers.

Clause 20. The article of any preceding clause, wherein the one or more coated fiber(s) are present in the form of a tow.

Clause 21. The article of any preceding clause, wherein the one or more coated fiber(s) are present in the form of a staple yarn or a filament yarn, and the cured coating is disposed on an outer surface of the yarn; optionally wherein the yarn has a tenacity of about 1.5 grams per Denier to about 4.0 grams per Denier; or has tenacity of greater than 4.0 grams per Denier; or has a tenacity of about 5.0 grams per Denier to about 10 grams per Denier.

Clause 22. The article of any preceding clause, wherein the one or more fiber(s) are present in the form of a textile, and optionally wherein the textile is a non-woven textile, a woven textile, a knit textile, a braided textile, or a crocheted textile.

Clause 23. The article of any preceding clause, wherein the one or more coated fiber(s) are present in the form of a textile, and the cured coating is disposed on an outer surface of the textile.

Clause 24. The article of any preceding clause, wherein the one or more coated fiber(s) are attached to a substrate, optionally wherein the one or more coated fiber(s) are stitched to or embroidered to the substrate.

Clause 25. The article of any preceding clause, wherein the one or more coated fiber(s) are formed of a first thermoplastic material, and the cured coating is disposed on the first polymeric material; optionally wherein the first thermoplastic material includes a polyurethane homopolymer or copolymer, a polyamide homopolymer or copolymer, a polyether homopolymer or copolymer, a polyester homopolymer or copolymer, a polyolefin homopolymer or copolymer, or any combination thereof; optionally wherein the first thermoplastic material includes a thermoplastic polyester homopolymer or copolymer and the cured coating comprises a crosslinked polyurethane homopolymer or copolymer.

Clause 26. The article of any preceding clause, wherein the one or more coated fiber(s) are formed of a first thermoplastic material, and the cured coating is disposed on the first polymeric material; optionally wherein a polymeric component of the first thermoplastic material consisting of all polymers present in the first thermoplastic material consists essentially of polyurethane homopolymers or copolymer, or consists essentially of polyamide homopolymers or copolymers, or consists essentially of polyether homopolymers or copolymers, or consists essentially of polyester homopolymers or copolymers, or consists essentially of polyolefin homopolymers or copolymers; optionally wherein the polymeric component of the first thermoplastic material consists essentially of thermoplastic polyester homopolymers or copolymers, and the cured coating comprises a crosslinked polyurethane homopolymer or copolymer.

Clause 27. The article of any preceding clause, wherein the one or more coated fiber(s) are formed of a first thermoplastic material including polyether block amide (PEBA), and the cured coating is disposed on the first polymeric material; optionally wherein the cured coating includes a matrix of crosslinked polyurethanes.

Clause 28. The article of any preceding clause, wherein the one or more coated fiber(s) are formed of a first thermoplastic material including poly(ethylene terephthalate), and the cured coating is disposed on the first polymeric material; optionally wherein the cured coating includes a matrix of crosslinked polyurethanes.

Clause 29. The article of any preceding clause, wherein the one or more coated fiber(s) are formed of a first thermoplastic material including a polyamide, and the cured coating is disposed on the first polymeric material; optionally wherein the polyamide is an aromatic polyamide; and optionally wherein the cured coating includes a matrix of crosslinked polyurethanes.

Clause 30. The article of any preceding clause, wherein the one or more coated fiber(s) are formed of a first thermoplastic material including a polyolefin, and the cured coating is disposed on the first polymeric material; optionally wherein the polyolefin includes a polyethylene homopolymer or copolymer, a polypropylene homopolymer or copolymer, or any combination thereof; and optionally wherein the cured coating includes a matrix of crosslinked polyurethanes.

Clause 31. The article of any preceding clause, wherein the article is a composite article, and the one or more coated fiber(s) are consolidated with a cured resin material, optionally wherein the cured resin material is substantially transparent.

Clause 32. The article of any preceding clause, wherein the article is a composite article, and the one or more coated fiber(s) are consolidated with a cured epoxy resin material, optionally wherein the cured epoxy resin material includes an aliphatic epoxy resin, a cycloaliphatic epoxy resin, an aromatic monofunctional epoxy resin, and any combination thereof; and optionally wherein the epoxy resin further comprises a curing agent Clause 33. The article of any preceding clause, wherein the article is a composite article, and the one or more coated fiber(s) are consolidated with a thermoplastic resin material, optionally wherein the thermoplastic resin material comprises a thermoplastic polyurethane; and optionally wherein the thermoplastic polyurethane is a polyester polyurethane.

Clause 34. The article of any preceding clause, wherein the article has an externally-facing side, and the one or more coated fiber(s) are visible on or through the externally-facing side.

Clause 35. The article of any preceding clause, wherein the article is an article of footwear, a component of footwear, an article of apparel, a component of an article of apparel, an article of sporting equipment, or a component of sporting equipment; optionally wherein the article is a cushioning component or a decorative component.

Clause 36. The article of any preceding clause, wherein the article is a component of an upper of an article of footwear or a component of a sole structure of an article of footwear; optionally wherein the article is a component of a sole structure of an article of footwear; and optionally wherein the article is a plate for an article of footwear, and the at least one coated fiber is visible on or through an external surface of the plate which is configured to be a ground-facing surface.

Clause 37. The article of any preceding clause, wherein the cured coating reduces a level of ultraviolet light reaching a first polymeric material forming the one or more fiber(s) as compared to a substantially identical fiber without the cured coating.

Clause 38. The article of preceding clause, wherein the cured coating reduces a level of water reaching a first polymeric material forming the one or more fiber(s) as compared to a substantially identical fiber without the cured coating.

Clause 39. An article of footwear, apparel or sporting equipment, wherein the article includes the one or more coated fiber(s) according to any of the preceding clauses.

Clause 40. A method of making an article, the method comprising: disposing a coating composition onto one or more fiber(s); and curing the coating composition on the one or more fiber(s), forming a cured coating including a matrix of crosslinked polymers.

Clause 41. The method of clause 40, wherein the disposing the coating composition comprises disposing a coating composition comprising a dispersion of uncrosslinked polymers in a carrier onto the one or more fiber(s); and forming the cured coating comprises crosslinking the uncrosslinked polymers of the dispersion to form the matrix of crosslinked polymers.

Clause 42. The method according to any clause 40 or 41, wherein the cured coating is a cured coating according to any of clauses 1 to 39.

Clause 43. The method according to any clause 40 to 42, wherein the coating composition is a coating composition according to any of clauses 1 to 39.

Clause 44. The method of any clauses 40 to 43, wherein the article is an article according to any one of clauses 1 to 39.

Clause 45. The method of any of clauses 40 to 44, wherein the disposing comprises spraying the coating composition onto the one or more fiber(s), brushing the coating composition onto the one or more fiber(s), or dipping the one or more fiber(s) into the coating composition.

Clause 46. The method of any of clauses 40 to 45, wherein the method further comprises disposing a dye solution to the one or more fiber(s) following the disposing the coating composition onto the one or more fiber(s).

Clause 47. The method of any of clauses 40 to 46, wherein the method further comprises printing on the one or more fiber(s) following the disposing the coating composition onto the one or more fiber(s).

Clause 48. The method of any of clauses 40-47, wherein the curing includes increasing a temperature of the coating composition to a temperature of from about 50 degrees C. to about 90 degrees C. for at least 1 minute; or optionally increasing the temperature of the coating composition to a temperature of from about 60 degrees C. to about 80 degrees C. for at least 1 minute.

Clause 49. A method of making a composite article, the method comprising: disposing a liquid resin material onto one or more coated fiber(s), wetting the one or more coated fiber(s) with the liquid resin material; and curing the liquid resin material, and forming a solid resin material surrounding and consolidating the one or more coated fiber(s); wherein the one or more coated fiber(s) are the one or more coated fiber(s) of any of clauses 1 to 39.

Clause 50. The method of clause 49, wherein the method further comprises affixing the one or more coated fiber(s) to a substrate prior to disposing the uncured resin material on the one or more coated fiber(s).

Clause 51. The method of clause 50, wherein the affixing comprises stitching or embroidering the one or more coated fiber(s) to the substrate.

Clause 52. A method of making an article, the method comprising: providing a first component according to any one of clauses 1 to 39, and attaching a second component to the first component to form an article.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 percent to about 5 percent" should be interpreted to include not only the explicitly recited concentration of about 0.1 wt percent to about 5 wt percent, but also include individual concentrations (e.g., 1 percent, 2 percent, 3 percent, and 4 percent) and the sub-ranges (e.g., 0.5 percent 1.1 percent, 2.2 percent, 3.3 percent, and 4.4 percent) within the indicated range. In an aspect, the term "about" can include traditional rounding according to significant figures of the numerical value. In addition, the phrase "about 'x' to 'y'" includes "about 'x' to about 'y'".

Many variations and modifications may be made to the above-described aspects. All such modifications and variations are intended to be included herein within the scope of this disclosure and protected by the following claims.

What is claimed is:

1. A composite component of an article comprising:
   one or more fiber(s); and
   a cured coating disposed on the one or more fiber(s), the cured coating including a plurality of pigment particles entrapped in a matrix of crosslinked polyurethane homopolymers or copolymers or both, wherein the cured coating is an elastomeric cured coating, wherein the composite component is a plate for an article, and the at least one coated fiber is visible on or through a side of the plate configured to be ground-facing during use.

2. The component of claim 1, wherein the matrix of crosslinked polymers includes crosslinked polyester polyurethanes, wherein the one or more coated fiber(s) include thermoplastic polyurethane fibers, thermoplastic polyamide fibers, thermoplastic polyester fibers, thermoplastic polyether fibers, thermoplastic polyolefin fibers, and any combination thereof.

3. The component of claim 1, wherein the one or more coated fiber(s) include glass fibers, carbon fibers, boron fibers and any combination thereof.

4. The component of claim 1, wherein the one or more coated fiber(s) are present in a yarn, and the coating is disposed on an outer surface of the yarn; or wherein the one or more coated fiber(s) are present in a textile, and the coating is disposed on an outer surface of the textile.

5. The component of claim 1, wherein the one or more coated fiber(s) are attached to a composite component and consolidated with a substantially transparent resin material, wherein the substantially transparent resin material is a substantially transparent thermoplastic polyurethane resin material or a substantially transparent cured epoxy resin material.

6. The component of claim 1, wherein the pigment particles are selected from the group consisting of: metal and metal oxide pigments, carbon pigments, clay earth pigments, ultramarine pigments and a combination thereof.

7. The component of claim 1, wherein the article is an article of sporting equipment.

8. The component of claim 1, wherein the article is an article of apparel.

9. The component of claim 1, wherein the matrix of crosslinked polymers includes crosslinked polyester polyurethanes, wherein the one or more coated fiber(s) include thermoplastic polyurethane fibers, thermoplastic polyamide fibers, thermoplastic polyester fibers, thermoplastic polyether fibers, thermoplastic polyolefin fibers, and any combination thereof, wherein the article is an article of footwear.

10. An article comprising:
    one or more fiber(s); and
    a cured coating disposed on the one or more fiber(s), the cured coating including a plurality of pigment particles entrapped in a matrix of crosslinked polyurethane homopolymers or copolymers or both, wherein the cured coating is an elastomeric cured coating, wherein the one or more fiber are disposed within a plate for the article, and the at least one coated fiber is visible on or through a side of the plate.

11. The article of claim 10, wherein the one or more coated fiber(s) include thermoplastic polyurethane fibers, thermoplastic polyamide fibers, thermoplastic polyester fibers, thermoplastic polyether fibers, thermoplastic polyolefin fibers, and any combination thereof or wherein the one or more coated fiber(s) include glass fibers, carbon fibers, boron fibers and any combination thereof.

12. The article of claim 10, wherein the one or more coated fiber(s) are present in a yarn, and the coating is disposed on an outer surface of the yarn.

13. The article of claim 10, wherein the one or more coated fiber(s) are present in the form of a tow.

14. The article of claim 10, wherein the article is an article of sporting equipment or apparel.

15. A composite component of an article comprising:
    one or more fiber(s); and
    a cured coating disposed on the one or more fiber(s), the cured coating including a plurality of pigment particles entrapped in a matrix of crosslinked polyurethane homopolymers or copolymers or both, wherein the cured coating is an elastomeric cured coating, and the one or more coated fiber(s) are consolidated with a substantially transparent resin material, wherein the composite component is a plate for an article, and the at least one coated fiber is visible on or through a side of the plate.

16. The component of claim 15, wherein the one or more coated fiber(s) include thermoplastic polyurethane fibers, thermoplastic polyamide fibers, thermoplastic polyester fibers, thermoplastic polyether fibers, thermoplastic polyolefin fibers, and any combination thereof.

17. The component of claim 15, wherein the one or more coated fiber(s) include glass fibers, carbon fibers, boron fibers and any combination thereof.

18. The component of claim 15, wherein the one or more coated fiber(s) are present in a yarn, and the coating is disposed on an outer surface of the yarn.

19. The component of claim 15, wherein substantially transparent resin material is selection from: a substantially transparent cured epoxy resin material or a substantially transparent thermoplastic polyurethane resin material.

20. The component of claim 15, wherein the article is an article of sporting equipment or apparel.

* * * * *